(12) United States Patent
Hillan et al.

(10) Patent No.: US 10,812,262 B2
(45) Date of Patent: Oct. 20, 2020

(54) PERFORMING A KEY AGREEMENT RECOVERY PROCEDURE

(71) Applicant: QUALCOMM Incorporated, San Diego, CA (US)

(72) Inventors: John Hillan, Alton (GB); Jeremy Robin Christopher O'Donoghue, Wokingham (GB)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 15/869,671

(22) Filed: Jan. 12, 2018

(65) Prior Publication Data

US 2019/0068369 A1 Feb. 28, 2019

Related U.S. Application Data

(60) Provisional application No. 62/551,939, filed on Aug. 30, 2017.

(51) Int. Cl.
*H04L 9/32* (2006.01)
*H04L 9/08* (2006.01)
(Continued)

(52) U.S. Cl.
CPC .......... *H04L 9/0894* (2013.01); *H04L 9/0838* (2013.01); *H04L 9/14* (2013.01);
(Continued)

(58) Field of Classification Search
CPC . H04L 9/0894; H04L 9/14; H04L 9/30; H04L 9/3226; H04L 9/0838; H04W 12/04; H04W 4/80
(Continued)

(56) References Cited

U.S. PATENT DOCUMENTS

| | | | | |
|---|---|---|---|---|
| 2007/0055877 A1* | 3/2007 | Persson | ................ | H04L 9/0891 713/171 |
| 2012/0054785 A1* | 3/2012 | Yang | ..................... | H04H 60/32 725/16 |
| 2012/0144193 A1* | 6/2012 | Le Saint | ............... | H04L 9/0825 713/168 |

OTHER PUBLICATIONS

Bluetooth SIG, Bluetooth Core Specification, Version 5.0, Dec. 6, 2016 (Year: 2016).*

(Continued)

*Primary Examiner* — Samson B Lemma
(74) *Attorney, Agent, or Firm* — Arent Fox, LLP and Qualcomm

(57) ABSTRACT

An initiator device and a target device may be configured to communicate with each other based on an anonymous key agreement procedure and an associated key agreement procedure. The anonymous key agreement procedure is performed for an initial communication session between the devices based on bonding identifiers (BIs) received in an attribute request/response. The BIs may be maintained by the devices to forego the anonymous key agreement procedure for subsequent communication sessions, where the devices may instead communicate based on an associated key agreement procedure. In cases where BIs are changed or lost by one of the devices, the associated key agreement procedure may not be performed and the anonymous key agreement procedure may be again attempted by the device. The other device is configured to determine that the anonymous key agreement procedure is being attempted and complete the anonymous key agreement procedure in an anonymous mode.

20 Claims, 14 Drawing Sheets

(51) Int. Cl.
    *H04L 9/30*     (2006.01)
    *H04L 9/14*     (2006.01)
    *H04W 12/04*     (2009.01)
    *H04W 4/80*     (2018.01)

(52) U.S. Cl.
    CPC .............. *H04L 9/30* (2013.01); *H04L 9/3226* (2013.01); *H04W 12/04* (2013.01); *H04W 4/80* (2018.02)

(58) Field of Classification Search
    USPC ........................................................ 713/171
    See application file for complete search history.

(56) References Cited

OTHER PUBLICATIONS

Diffie W., et al., "New Directions in Cryptography", IEEE Transactions on Information Theory, IEEE Press, USA, vol. 22, No. 6, Nov. 1976, pp. 644-654, XP000565260, ISSN: 0018-9448, DOI: 10.1109/TIT.1976.1 055638.
International Search Report and Written Opinion—PCT/US2018/042506—ISA/EPO—dated Sep. 19, 2018 (175635WO).

\* cited by examiner

Recovered Key Agreement (Initiator Factory Reset or Target Memory Corruption)

PERFORMING A KEY AGREEMENT RECOVERY PROCEDURE

CROSS-REFERENCE TO RELATED APPLICATION(S)

This application claims the benefit of U.S. Provisional Application Ser. No. 62/551,939, entitled "PERFORMING A KEY AGREEMENT RECOVERY PROCEDURE" and filed on Aug. 30, 2017, which is expressly incorporated by reference herein in its entirety.

BACKGROUND

Field

The present disclosure relates generally to communication systems, and more particularly, to a key agreement recovery procedure for short-range communication devices.

Background

Advances in technology have resulted in smaller and more powerful personal computing devices. Personal computing devices include wireless handheld devices such as smart phones and tablet devices. Wireless handheld devices are configured to operate within wireless communication systems, and are widely deployed to provide various telecommunication services such as telephony, video, data, messaging, and broadcasts. Further, wireless handheld devices may be configured to communicate using a variety of frequencies and applicable coverage areas, such as cellular communications, wireless local area network (WLAN) communications, near field communication (NFC), etc.

Wireless handheld devices that communicate using NFC may perform an anonymous key agreement procedure in order to share bonding identifiers (BIs), establish a shared secret key, and establish a session key during an initial communication session. By sharing BIs, establishing a shared secret key, and establishing a session key during the initial communication session, a first device and a second device may be able to perform encrypted communication.

The first device may maintain a first correlation between a second BI and the shared secret key, and vice versa, in order to forego performing another anonymous key agreement procedure during a subsequent communication session. However, in scenarios in which the first BI, the second BI, and/or the shared secret key are changed or lost, the first device and the second device may attempt different types of key agreement procedures (e.g., anonymous mode and associated mode) during a subsequent communication session. Hence, key agreement procedure failure may occur at the first device and/or the second device during a subsequent communication session, and a communication link may not be established between the first device and the second device.

Thus, there exists a need for a key agreement recovery procedure that may be performed when failure of a key agreement procedure occurs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Wireless handheld devices that communicate using NFC may perform an anonymous key agreement procedure in order to share BIs, establish a shared secret key, and establish a session key during an initial communication session. By sharing BIs, establishing a shared secret key, and establishing a session key during the initial communication session, a first device and a second device may be able to perform encrypted communication.

The first device may maintain a first correlation between the second BI of the second device, and the shared secret and the session key with the second device, and vice versa, in order to forego the anonymous key agreement procedure during a subsequent communication session.

During the subsequent communication session, the first device and the second device may perform an associated key agreement to establish a new secure communication link using the maintained correlation between the other device's BI, and the shared secret that was established during the anonymous key agreement procedure. However, in certain scenarios, the first BI associated with one of the first device may change, e.g., after factory reset. Consequently, the associated key agreement may fail due to the new BI of the first device not being recognized by the second device, or vice versa.

In certain other scenarios, the first device may lose or alter the shared secret key (e.g., the first device may maintain the shared secret key with the second BI of the second device), e.g., after a memory corruption. Consequently, associated key agreement failure may occur when the second BI of the second device is not recognized by the first device during a subsequent communication session, or vice versa.

In either scenario, the first device and the second device may attempt different types of key agreement procedures (e.g., anonymous key agreement procedure or associated key agreement procedures). Hence, key agreement procedure failure may occur at the first device and/or the second device during a subsequent communication session because the two devices are attempting different key agreement procedures, and a communication link may not be established between the first device and the second device.

Thus, there exists a need for a key agreement recovery procedure that may be performed when key agreement procedure failure occurs.

The present disclosure provides a solution by performing a key agreement recovery procedure that triggers a subsequent anonymous key agreement procedure to be performed by both devices when one of the devices determines that different types of key agreement procedures are being performed.

In an aspect of the disclosure, a method, a computer-readable medium, and an apparatus are provided. In certain implementations, the apparatus may perform a first key agreement procedure to determine a first shared secret for communicating with a second device. In one aspect, the first shared secret may be associated with first BI of the first device and a second BI of the second device. The apparatus may maintain a first correlation between the first shared secret and the second BI. The apparatus may perform a key agreement recovery procedure when it is determined that the second device does not maintain a second correlation between the first shared secret and the first BI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
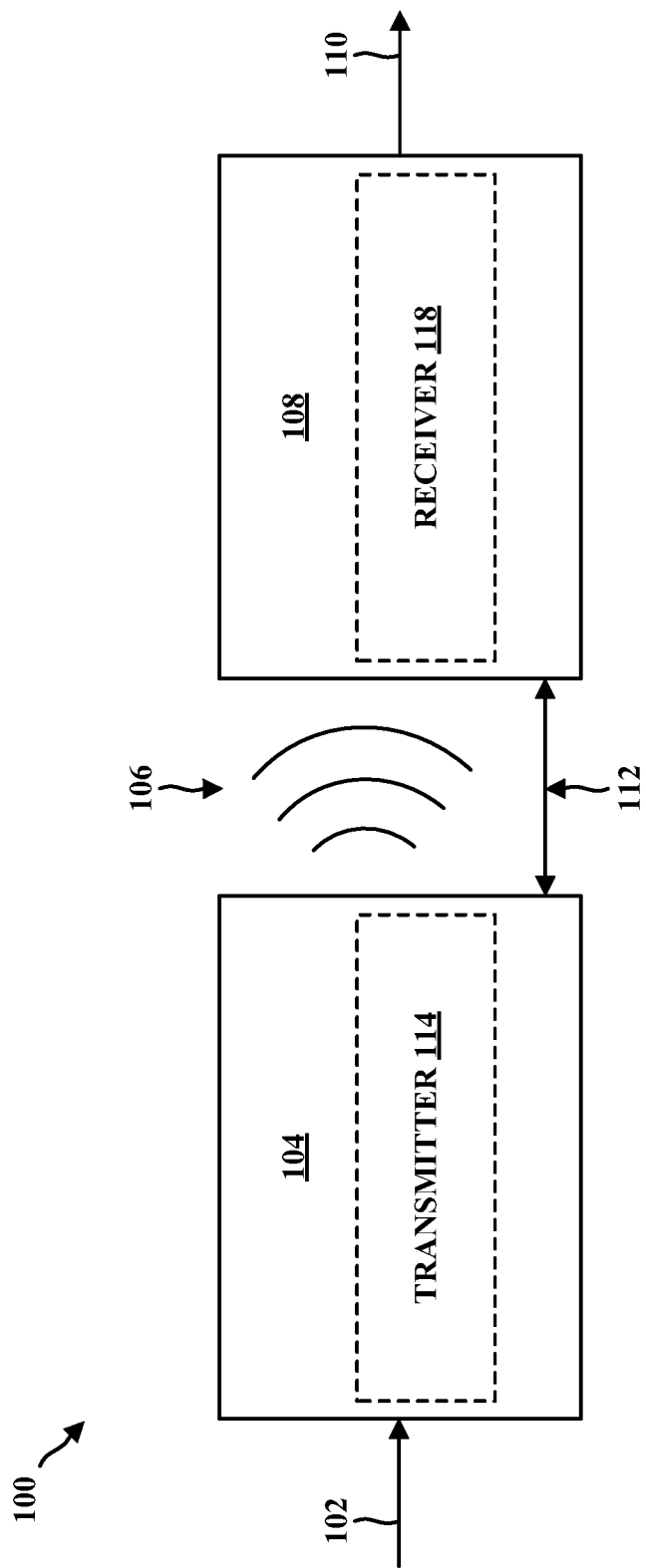
FIG. 1 is a block diagram of a wireless communication system in accordance with certain aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structure.

FIG. 1 illustrates an NFC system 100 in accordance with various aspects of the present invention. Input power 102 is provided to a transmitter 104 for generating a radiated field 106 that provides energy transfer. A receiver 108 may couple to the radiated field 106 and generate an output power 110 that may be stored or used to power a device (not shown) coupled to the output power 110. Both the transmitter 104 and the receiver 108 are separated by a distance 112. In certain configurations, transmitter 104 and receiver 108 may be configured according to a mutual resonant relationship and when the resonant frequency of receiver 108 and the resonant frequency of transmitter 104 are very close, transmission losses between the transmitter 104 and the receiver 108 may be reduced when the receiver 108 is located in the "near-field" of the radiated field 106.

The transmitter 104 may include a transmit antenna 114 for providing energy transmission. The receiver 108 may include a receive antenna 118 that provides energy reception. The transmit and receive antennas 114, 118 may be sized according to applications and devices associated therewith. An efficient energy transfer may be provided by coupling a large portion of the energy in the near-field of the transmit 114 antenna to the receive antenna 118 rather than propagating most of the energy in an electromagnetic wave to the "far-field" (e.g., a distance that is greater than distance 112). During NFC, a coupling mode may be developed between the transmit antenna 114 and the receive antenna 118. The area around the antennas 114 and 118 where the near-field coupling may occur is referred to herein as a coupling-mode region.

Figure 2:
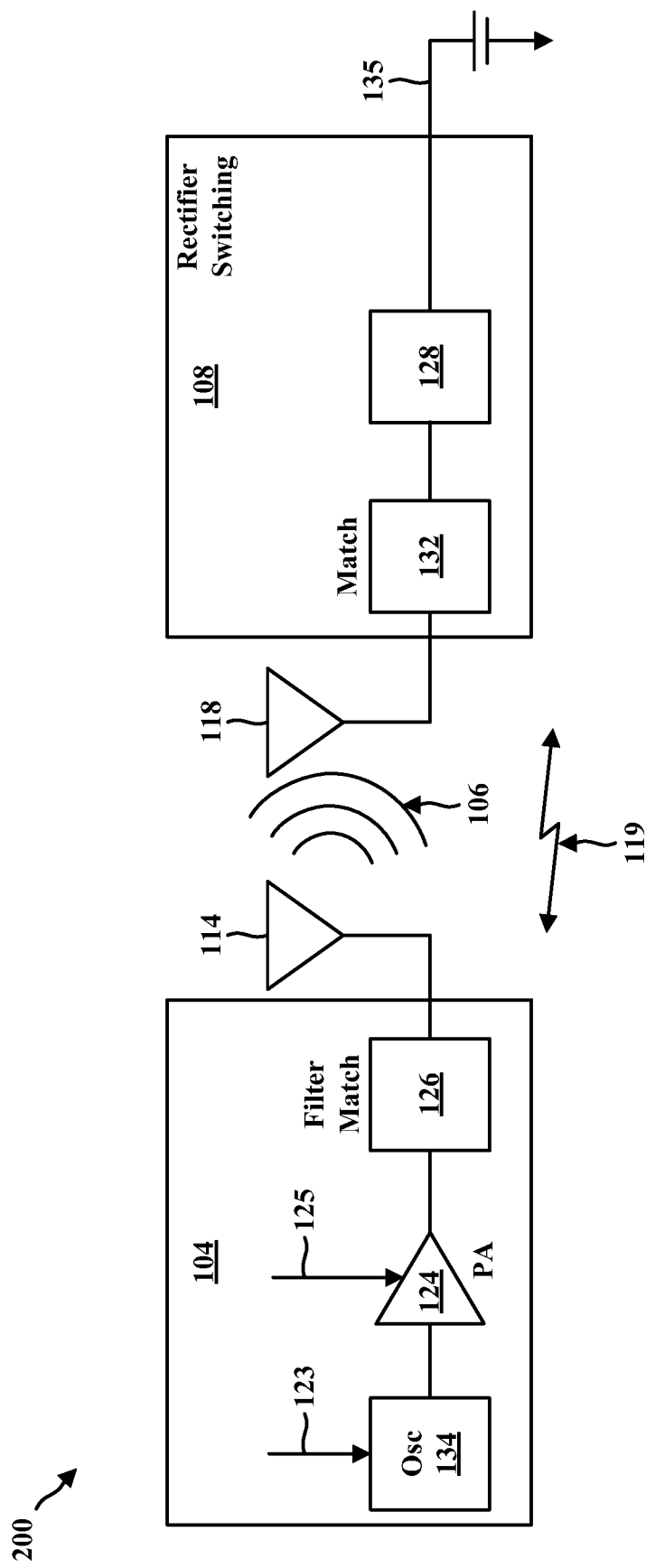
FIG. 2 is a schematic diagram of a wireless communication system in accordance with certain aspects of the disclosure.

FIG. 2 is a schematic diagram 200 of an example NFC system. The transmitter 104 includes an oscillator 134, a power amplifier 124 and a filter and matching circuit 126. The oscillator 134 is configured to generate a signal at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 128 to generate a DC power output to charge a battery 135 or power a device coupled to the receiver 108 (not illustrated). The matching circuit 132 may be included to match the impedance of the receiver 108 to the receive antenna 118. The receiver 108 and transmitter 104 may also communicate on a separate communication channel 119 (e.g., Bluetooth®, Zigbee, cellular, etc.).

Wireless handheld devices that communicate using NFC may perform an anonymous key agreement procedure in order to share BIs, establish a shared secret key, and establish a session key during an initial communication session. By sharing BIs, establishing a shared secret key, and establishing a session key during the initial communication session, a first device and a second device may be able to perform encrypted communication.

The first device may maintain a first correlation between the second BI of the second device, and the shared secret and the session key with the second device, and vice versa, in order to forego the anonymous key agreement procedure during a subsequent communication session.

During the subsequent communication session, the first device and the second device may perform an associated key agreement to establish a new secure communication link using the maintained correlation between the other device's BI, and the shared secret that was established during the anonymous key agreement procedure. However, in certain scenarios, the first BI associated with one of the first device may change, e.g., after factory reset. Consequently, the associated key agreement may fail due to the new BI of the first device not being recognized by the second device, or vice versa.

In certain other scenarios, the first device may lose or alter the shared secret key (e.g., the first device may maintain the shared secret key with the second BI of the second device), e.g., after a memory corruption. Consequently, associated key agreement failure may occur when the second BI of the second device is not recognized by the first device during a subsequent communication session, or vice versa.

In either scenario, the first device and the second device may attempt different types of key agreement procedures (e.g., anonymous key agreement procedure or associated key agreement procedures). Hence, key agreement procedure failure may occur at the first device and/or the second device during a subsequent communication session, and a communication link may not be established between the first device and the second device.

Thus, there exists a need for a key agreement recovery procedure that may be performed when key agreement procedure failure occurs.

The present disclosure provides a solution by performing a key agreement recovery procedure that triggers a subsequent anonymous key agreement procedure to be performed by both devices when one of the devices determines that different types of key agreement procedures are being performed.

Figure 3A:
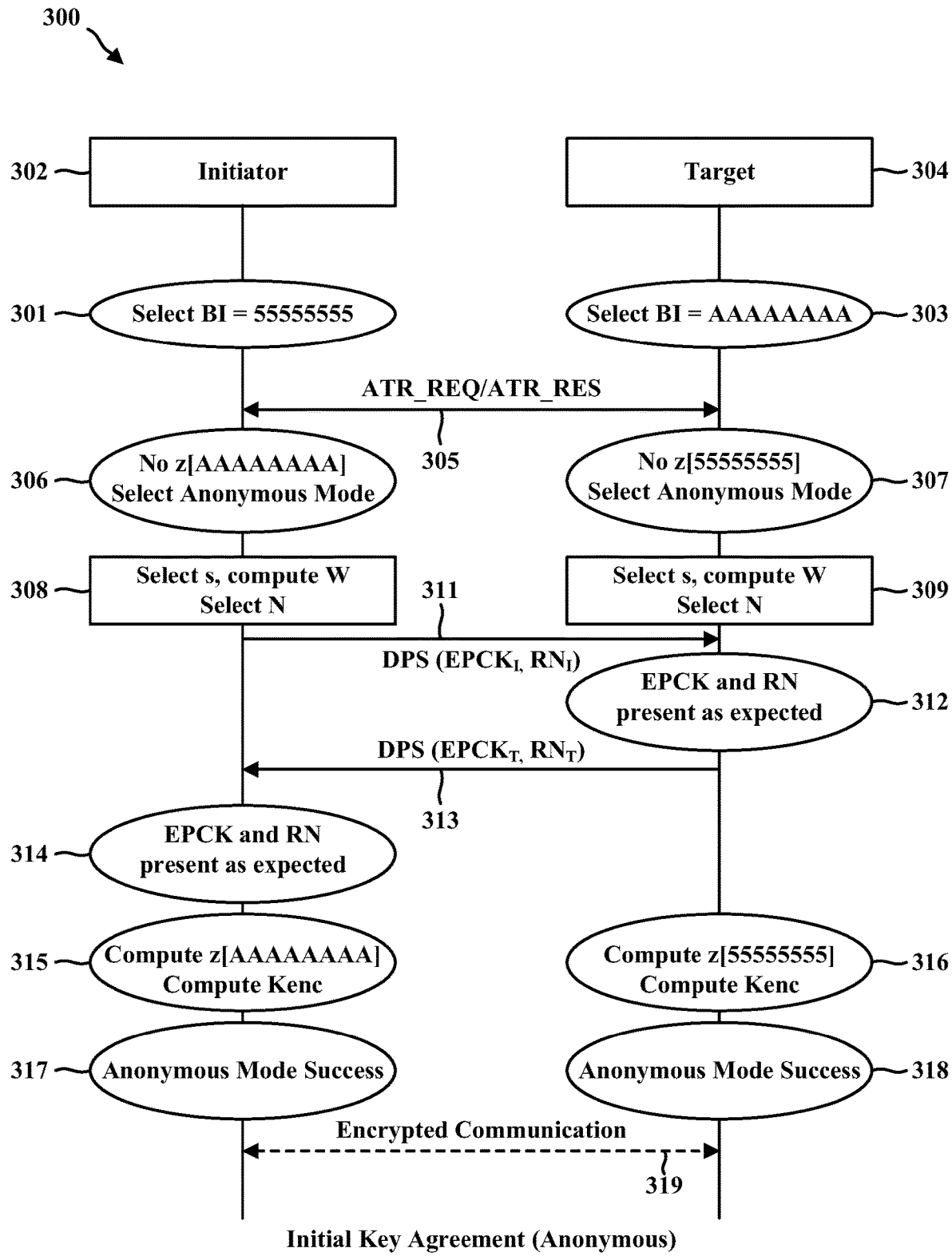
FIG. 3A is a data flow illustrating an anonymous key agreement procedure in accordance with certain aspects of the disclosure.

FIG. 3A is a data flow 300 illustrating an anonymous key agreement procedure in accordance with certain aspects of the disclosure.

As seen in FIG. 3A, an initiator 302 (e.g., initiator device) may determine and/or select (at 301) a first BI (e.g., first BI=55555555), and a target 304 (e.g., target device) may determine and/or select (at 303) a second BI (e.g., second BI=AAAAAAAA). The initiator 302 may transmit (at 305) an attribute request (ATR_REQ) PDU to the target 304. The ATR_REQ may include information associated with the first BI. The target 304 may respond by transmitting (at 305) an attribute response (ATR_RES) PDU to the initiator 302. The ATR_RES PDU may include information associated with the second BI.

The first BI and the second BI may be exchanged during a link activation process that is performed when the initiator 302 and/or the target 304 detect the presence of the other device (e.g., when the initiator 302 is placed within a predetermined distance from the target 304, or vice versa). In certain configurations, the first BI and the second BI may be used to convey a respective device identity under which a shared secret z can be associated or restored.

A BI may be chosen randomly when a device is used for the first time or after a factory reset. All values of shared secret z which are associated with a BI of a remote device may be destroyed whenever a new BI is chosen. The BI parameter value may be encoded as a sequence of eight octets representing the BI integer value with a particular conversion. A receiving device may apply the particular conversion to obtain the BI integer value received in the ATR_REQ PDU or the ATR_RES PDU.

The initiator 302 may determine (at 306) a shared secret (e.g., No z[AAAAAAAA]) based at least in part on the second BI. The target 304 may determine (at 307) the shared secret (e.g., No z[55555555]) based at least in part on the first BI.

Each of the initiator 302 and the target 304 may determine (at 308 and 309, respectively) a valid set of elliptic curve domain parameters as Curve P-256. Each of the initiator 302 and the target 304 may determine a valid private key s (at 308 and 309, respectively), associated with the valid set of elliptic curve domain parameters. The valid private key s may be the output of a random or pseudo-random process. Each of the initiator 302 and the target 304 may determine a public key W=sG (at 308 and 309, respectively), with the sample base point G on Curve P-256. Each of the initiator 302 and the target 304 may determine (at 308 and 309, respectively) a random nonce N as 64 bits of output from a random or pseudo-random process.

The initiator 302 may transmit a first PDU (at 311) to the target 304. In certain configurations, the first PDU may be a data protection setup (DPS) PDU. The first PDU may include an elliptic curve public key (ECPK)$_I$ parameter that corresponds to the public key W and an random number (RN)$_I$ parameter that corresponds to the nonce N, respectively.

When the first DPS PDU does not contain a valid ECPK parameter that corresponds to the public key W determined (at 309) by the target 304 and/or a valid random number (RN) parameter that corresponds to the nonce N determined (at 309) by the target 304, the target 304 may terminate the key agreement procedure with an "abort" indication (not shown in FIG. 3A). When the first DPS PDU does not contain a valid EPCK parameter and/or a valid RN parameter, the target 304 may implement a bonding signal problem mechanism (not shown in FIG. 3A) and terminate the key agreement procedure with an "abort" indication (not shown in FIG. 3A). In certain configurations, the target 304 may implement the bonding signal problem mechanism by sending an empty DPS PDU (not shown in FIG. 3A) to the initiator 302. In certain other configurations, the target 304 may implement the bonding signal problem mechanism by not responding. In certain other configurations, the target 304 may implement the bonding signal problem mechanism by responding with a PDU with at least one term (e.g., EPCK, RN, etc.) absent. In certain other configurations, the target 304 may implement the bonding signal problem mechanism by responding with a PDU containing an error code. Receiving a first DPS PDU that does not include a valid EPCK parameter and/ or valid RN parameter may indicate to the target 304 that a bonding problem has occurred, and that the initiator 302 is attempting anonymous key agreement, while the target 304 is expecting associated key agreement. Otherwise, when the first DPS PDU does contain a valid ECPK parameter and a valid RN parameter, the target 304 may determine (at 312) that the first DPS PDU contains a valid ECPK parameter and a valid RN parameter, and the target 304 may extract public key W' and nonce N' from the ECPK$_I$ and RN$_I$ parameter, respectively, and set N$_T$=N and N$_T$=N'.

The target 304 may send (at 313) a second DPS PDU that includes an ECPK$_T$ parameter that corresponds to the public key W and a RN$_T$ parameter that corresponds to the nonce N, respectively. If the second DPS PDU does not contain a valid ECPK parameter and a valid RN parameter, then the initiator 302 may terminate the key agreement procedure with an "abort" indication (not shown in FIG. 3A). Receiving a DPS PDU that does not contain a valid ECPK and a valid RN parameter may indicate to the initiator 302 that a bonding problem has occurred, and the target 304 may be attempting an associated key agreement. Otherwise, the initiator 302 may determine (at 314) that the second DPS PDU contains a valid ECPK parameter and a valid RN parameter, and the initiator 302 may extract the public key W' and nonce N' from the ECPK$_T$ and RN$_T$ parameter, respectively, and set N$_I$=N and N$_T$=N'.

When both the first DPS PDU and the second DPS PDU include a valid ECPK and a valid RN parameter, the initiator 302 and the target 304 may each determine an elliptic curve point P=sW', associated with the valid set of elliptic curve domain parameters.

If the initiator 302 and/or the target 304 determines that P=O (e.g., the elliptic point is at infinity), the initiator 302 and/or the target 304 may terminate the key agreement procedure with an "error" indication. The initiator 302 and the target 304 may determine (at 315 and 316, respectively) the shared secret value z (e.g., z[AAAAAAAA] and z[55555555] is equal to xp, xp is the x-coordinate of P.

The initiator 302 and/or the target 304 may determine K=N$_I$||N$_T$, which may be a concatenation of the nonces exchanged in the first DPS PDU and the second DPS PDU. In certain configurations, K may be a 128-bit key.

The initiator 302 and the target 304 may determine (at 315 and 316, respectively) an encrypted key Kenc using an authentication algorithm AES-CMAC, K described above, and z, such that Kenc=AES-CMACK(z).

The initiator 302 and the target 304 may initialize a respective Send Packet Counter PC(S) and Receive Packet Counter PC(R) to zero. The initiator 302 and the target may destroy the private key s. If both the initiator and the target transmit the BI parameter and the OPT parameter with BM bit set to one, then the initiator and the target may maintain the shared secret value z for future associated key agreement with the other device by correlating the secret value z with the received BI parameter value of the other device. Otherwise, the initiator and/or the target may destroy the shared secret value z.

As seen in FIG. 3A, the anonymous key agreement is successful (at 317, 318), and encrypted communication may be performed (at 319) between the initiator 302 and the target 304.

Figure 3B:
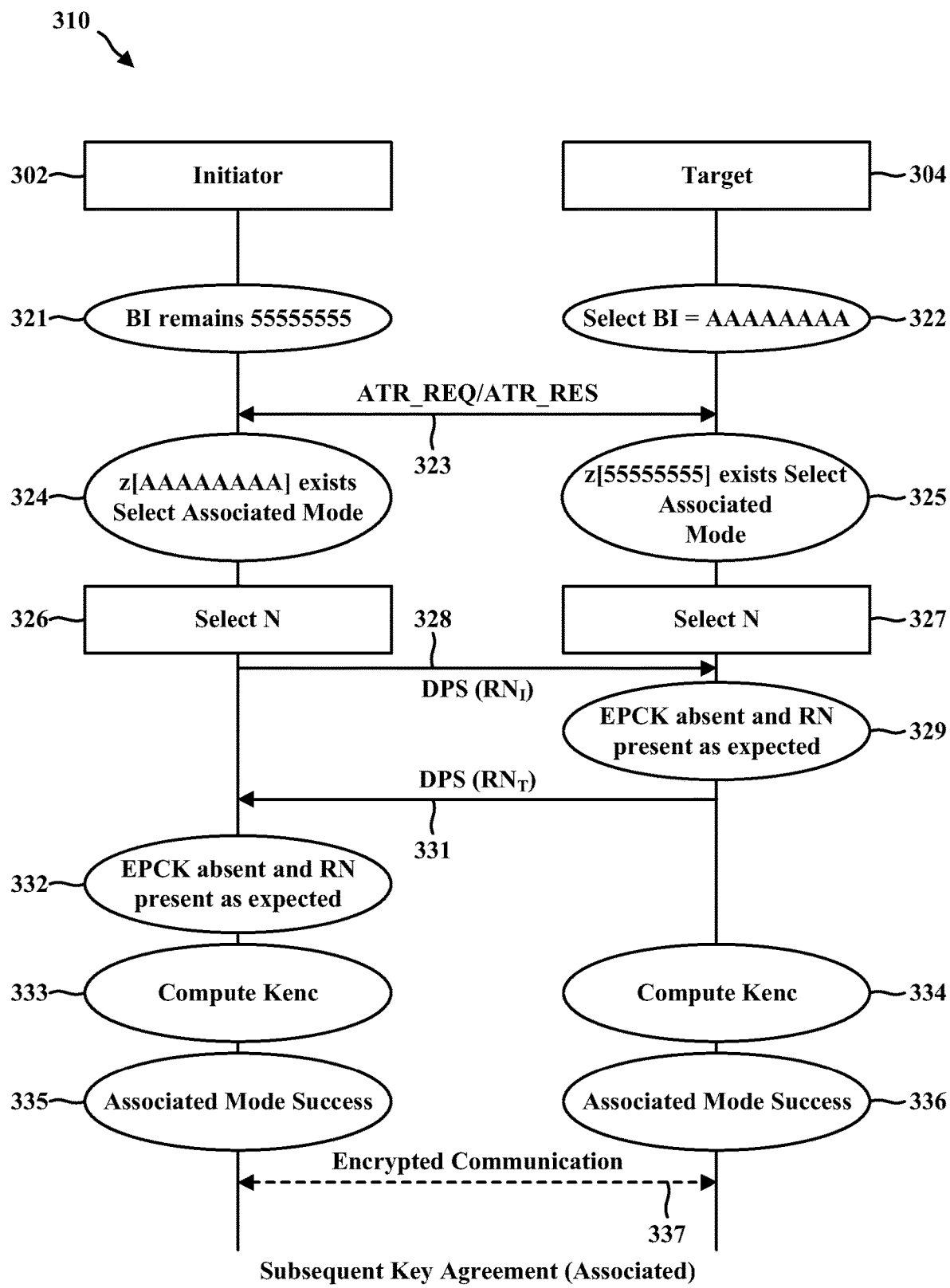
FIG. 3B is a data flow illustrating an associated key agreement procedure in accordance with certain aspects of the disclosure.

FIG. 3B is a data flow 310 illustrating an associated key agreement procedure in accordance with certain aspects of the disclosure.

As seen in FIG. 3B, the first BI associated with the initiator 302 remains (at 321) the same (e.g., first BI=55555555), and the second BI associated with the target 304 remains (at 322) the same (e.g., second BI=AAAAAAAA). The initiator 302 may transmit (at 323) a ATR_REQ that includes the first BI to the target 304. The target 304 may respond by transmitting (at 323) a ATR_RES that includes the second BI to the initiator 302.

The initiator 302 may determine (at 324) that a shared secret (e.g., z[AAAAAAA]) is associated with the second BI (e.g., indicating that an anonymous key agreement was previously performed). The target 304 may also determine (at 325) that the shared secret (e.g., z[5555555]) is associated with the first BI.

The initiator 302 may determine (at 326) a nonce N as 64 bits of output from a random or pseudo-random process. The target 304 may also determine (at 327) a nonce N as 64 bits of output from a random or pseudo-random process.

The initiator 302 may transmit (at 328) a first DPS PDU with nonce N$_I$ as the value of a RN$_I$ parameter and await receipt of a second DPS PDU transmitted (at 331) by the target 304. The target 304 may receive the first DPS PDU transmitted (at 328) by the initiator 302. If the received first DPS PDU does not contain a valid RN parameter, the target 304 may terminate the key agreement procedure with an "abort" indication. If the received first DPS PDU also contains a valid EPCK parameter, the target 304 may destroy the shared secret z[5555555] correlated with the first BI parameter value from the anonymous key agreement. The target 304 may implement a bonding problem signal mechanism (not shown in FIG. 3B), and terminate the key agreement procedure with an "abort" indication. In certain configurations, the target 304 may implement the bonding signal problem mechanism by sending an empty DPS PDU to the initiator 302. In certain other configurations, the target 304 may implement the bonding signal problem mechanism by not responding. In certain other configurations, the target 304 may implement the bonding signal problem mechanism by responding with a PDU with at least one term (e.g., EPCK, RN, etc.) absent. In certain other configurations, the target 304 may implement the bonding signal problem mechanism by responding with a PDU containing an error code.

Receiving the first DPS that contains both a valid RN and a valid EPCK parameter (not shown in FIG. 3B) may indicate that a bonding problem has occurred and the initiator is attempting anonymous key agreement. Otherwise, as illustrated in FIG. 3B, when the target 304 determines (at 329) that the first DPS PDU includes a valid RN and the EPCK is absent from the first DPS PDU as expected, the target 304 may extract nonce N' from the RN parameter and set $N_I$=N and $N_T$=N'. The target 304 may transmit (at 331) the second DPS PDU with the nonce N as the value of a RN parameter.

If the second DPS PDU transmitted (at 331) by the target 304 does not include a valid RN parameter (not shown in FIG. 3B), the initiator 302 may remove and/or destroy the shared secret z[AAAAAAA] for the target 304 correlated with the second BI parameter value from the anonymous key agreement. The initiator 302 may terminate the associated key agreement procedure with an "abort" indication (not shown in FIG. 3B). Receiving a DPS PDU that does not include a valid RN parameter may indicate that a bonding problem has occurred and the target 304 is attempting anonymous key agreement (not shown in FIG. 3B). Otherwise, as illustrated in FIG. 3B, when the initiator 302 determines (at 332) that the second DPS PDU includes a valid RN and the EPCK is absent from the second DPS PDU as expected, the initiator 302 may extract nonce N' from the RN parameter and set $N_I$=N and $N_T$=N'. In certain configurations, the initiator 302 and the target 304 may determine the shared secret associated with the first BI and/or the second BI that was maintained after the anonymous key agreement. The In certain other configurations, the initiator 302 and/or the target 304 may determine K=$N_I$||$N_T$, which may be a concatenation of the nonces $N_I$ and $N_T$ exchanged in the first DPS PDU and the second DPS PDU.

The initiator 302 and the target 304 may determine (at 333, 334) KENC=AES-CMACK(z) using an authentication algorithm (e.g., AES-CMAC), where K is a 128-bit key, message M=z, and the length of z in octets len=32.

In certain configurations, the initiator 302 and the target 304 may initialize a respective Send Packet Counter PC(S) and Receive Packet Counter PC(R) to zero.

As seen in FIG. 3B, the initiator 302 and the target 304 may determine (at 335, 336) that associated key agreement is successful, and encrypted communication may be performed (at 337) between the initiator 302 and the target 304.

Figure 3C:
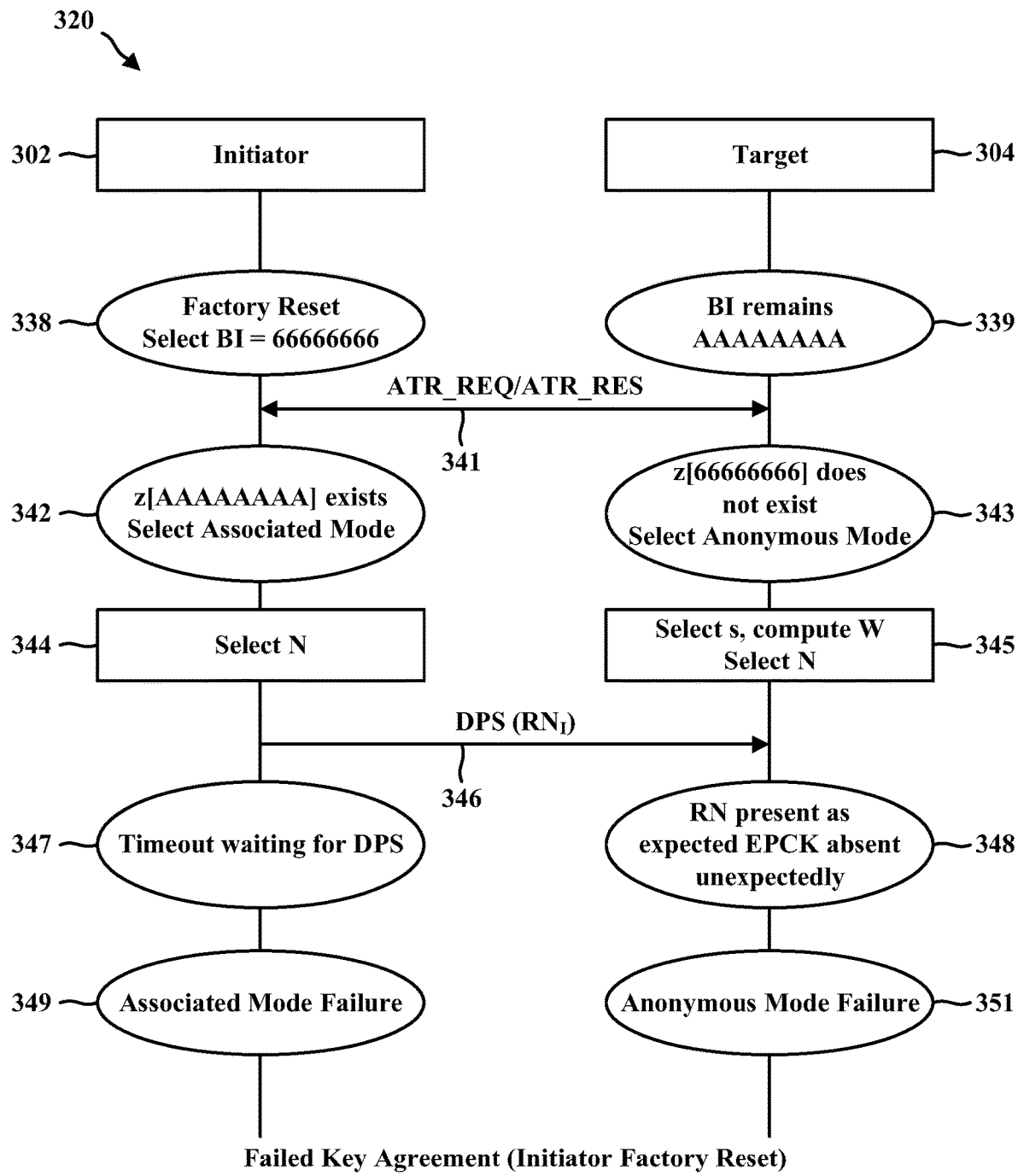
FIG. 3C is a data flow illustrating a failed key agreement due to factory reset of an initiator device in accordance with certain aspects of the disclosure.

FIG. 3C is a data flow 320 illustrating a failed key agreement due to factory reset of an initiator 302 in accordance with certain aspects of the disclosure.

As seen in FIG. 3C, the initiator 302 may have undergone factory reset, which changes the first BI of the initiator 302 from 55555555 to 66666666 (at 338). The second BI associated with the target 304 may remain the same (at 339).

The initiator 302 may transmit (at 341) a ATR_REQ PDU that includes the changed first BI (e.g., first BI=66666666). The target 304 may transmit (at 341) an ATR_RES PDU that includes the same second BI that was previously used. Because the second BI remains unchanged, the initiator 302 may determine (at 342) that a correlation of a shared secret z[AAAAAAA] with the second BI is maintained, and hence, the initiator 302 may determine (at 342) to perform associated key agreement with the target 304. However, because the first BI is changed, the target 304 may determine (at 343) that a shared secret z[6666666] associated with the new first BI does not exist, and hence, determines (at 343) to perform anonymous mode key agreement.

Because the initiator 302 determines (at 342) to perform associated mode key agreement, the initiator 302 may determine (at 344) a nonce N based on the techniques described above in connection with FIG. 3B.

Because the target 304 determines (at 343) to perform anonymous mode key agreement, the target 304 may determine (at 345) a nonce N, a valid private key s, and a valid public key W using the techniques described above in connection with FIG. 3A.

The initiator 302 may transmit (at 346) a DPS PDU including the $RN_I$ that is received by the target 304. The target 304 may determine (at 348) that while $RN_I$ is included in the DPS PDU as expected, an EPCK is unexpectedly absent from the DPS PDU. Hence, the target 304 may implement a bonding problem signal mechanism in response to the DPS PDU transmitted (at 346) by the initiator 302. In certain configurations, the target 304 may implement the bonding signal problem mechanism by sending an empty DPS PDU to the initiator 302. In certain other configurations, the target 304 may implement the bonding signal problem mechanism by not responding. In certain other configurations, the target 304 may implement the bonding signal problem mechanism by responding with a PDU with at least one term (e.g., EPCK, RN, etc.) absent. In certain other configurations, the target 304 may implement the bonding signal problem mechanism by responding with a PDU containing an error code. The initiator 302 may timeout (at 347) waiting for a DPS PDU from the target 304.

The attempt to perform the associated key agreement by the initiator 302 may fail (at 349), and the attempt to perform the anonymous key agreement by the target 304 may fail (at 351). Due to the failure of the key agreement procedures performed by the initiator 302 and the target 304, a connection may not be established.

Figure 3D:
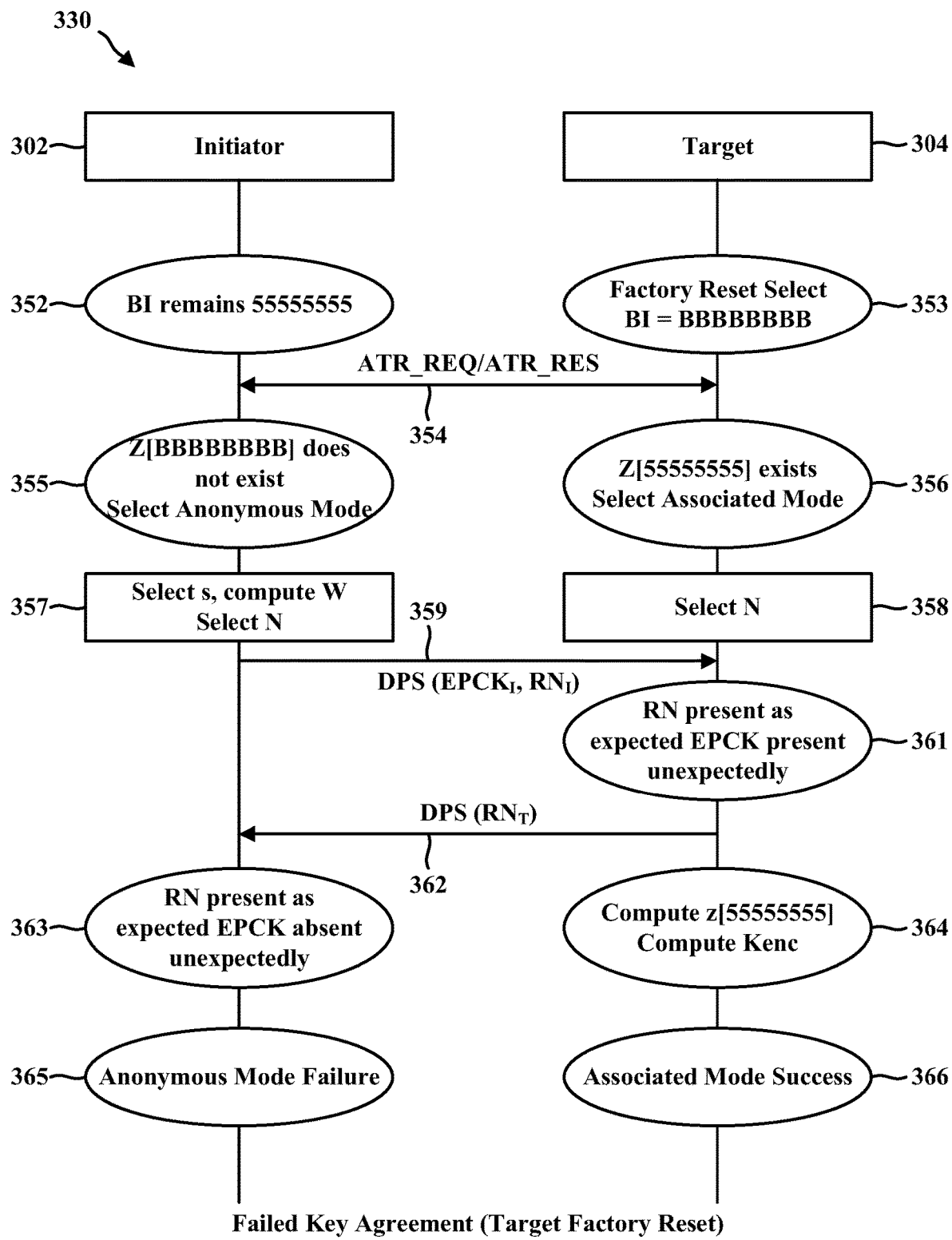
FIG. 3D is a data flow illustrating a failed key agreement due to factory reset of a target device in accordance with certain aspects of the disclosure.

FIG. 3D is a data flow 330 illustrating a failed key agreement due to factory reset of a target 304 in accordance with certain aspects of the disclosure.

As seen in FIG. 3D, the first BI associated with the initiator 302 may remain (at 352) the same (e.g., first BI=55555555). However, the target 304 may undergo a factory reset and the second BI may be changed (at 353) from AAAAAAAA to BBBBBBBB.

The initiator 302 may transmit (at 354) a ATR_REQ PDU that includes the first BI (e.g., first BI=55555555) that was previously used in the initial key agreement procedure described above in connection with FIG. 3A. The target 304 may transmit (at 354) an ATR_RES PDU that includes the new second BI (e.g., second BI=BBBBBBBB). Because the first BI remains unchanged, the target 304 may determine (at 356) that a correlation of a shared secret with the first BI is maintained, and hence, may determine (at 356) to perform an associated key agreement. Because the second BI is changed, the initiator 302 may determine (at 355) that a shared secret z[BBBBBBBB] associated with the new second BI does not exist, and hence, determine (at 355) to perform an anonymous key agreement.

Because the initiator 302 determines (at 355) to perform an anonymous key agreement, the initiator 302 may determine (at 357) a nonce N, a valid private key s, and a valid public key W using the techniques described above in connection with FIG. 3A.

Because the target determines (at 356) to perform an associated key agreement, the target 304 may determine (at 358) a nonce N using the techniques described above in connection with FIG. 3B.

The initiator 302 may transmit (at 359) a first DPS PDU that includes $EPCK_I$ and $RN_I$ to the target 304. The target 304 may determine (at 361) that the $RN_I$ is included in the first DPS PDU as excepted but that there is an EPCK unexpectedly included in the first DPS PDU.

The target 304 may implement a bonding signal problem mechanism by transmitting (at 362) a second DPS PDU that includes an $RN_T$ that is received by the initiator 302. In certain configurations, the target 304 may implement the bonding signal problem mechanism by sending an empty DPS PDU (not shown in FIG. 3D) to the initiator 302. In certain other configurations, the target 304 may implement the bonding signal problem mechanism by not responding (not shown in FIG. 3D). In certain other configurations, the target 304 may implement the bonding signal problem mechanism by responding with a PDU (not shown in FIG. 3D) containing an error code. The initiator 302 may determine (at 363) that an RN is present in the second DPS PDU as expected, but that an EPCK is unexpectedly absent from the second DPS PDU.

Because the target 304 determines (at 356) to perform an associated key agreement, the target 304 may determine (at 364) z[5555555] and the $K_{ENC}$ as described above in connection with FIG. 3B, and the initiator 302 may not determine the $K_{ENC}$. Hence, the initiator's 302 attempt to perform the anonymous key agreement may fail (at 365), and the target's 304 attempt to perform the associated key agreement may succeed (at 366). Because the initiator 302 and the target 304 perform different key agreement procedures, even though the associated key agreement performed by the target 304 succeeds, a communication link may not be established between the initiator 302 and the target 304.

Figure 3E:
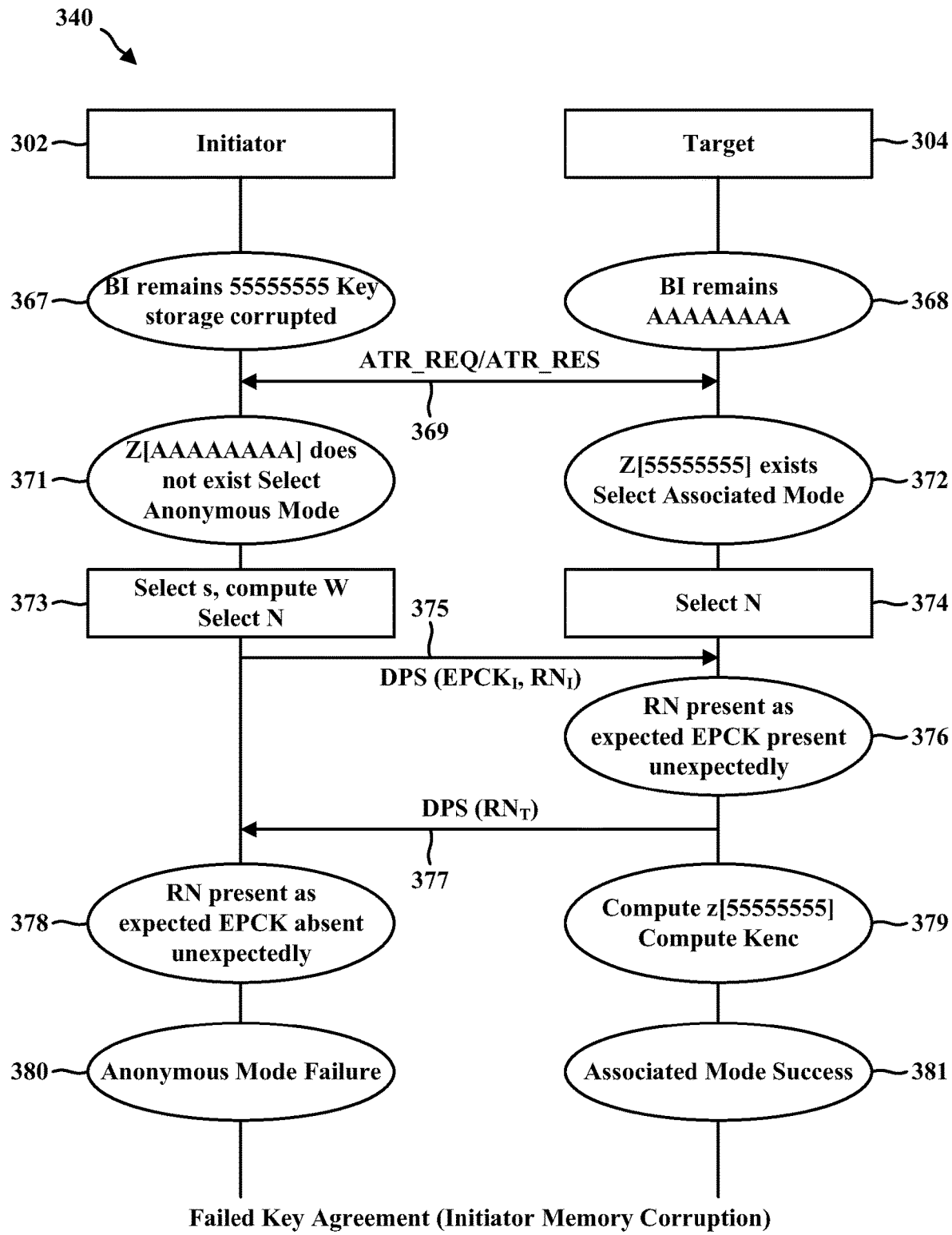
FIG. 3E is a data flow illustrating a failed key agreement due to memory corruption at an initiator device in accordance with certain aspects of the disclosure.

FIG. 3E is a data flow 340 illustrating a failed key agreement due to memory corruption at an initiator 302 in accordance with certain aspects of the disclosure.

As seen in FIG. 3E, the initiator 302 may experience (at 367) memory corruption (e.g., correlations of BIs and shared secrets are no longer recognizable), but the first BI associated with the initiator 302 may remain (at 367) the same (e.g., first BI=55555555). The second BI associated with the target 304 may remain (at 368) the same (e.g., second BI=AAAAAAAA).

The initiator 302 may transmit (at 369) a ATR_REQ PDU that includes the first BI (e.g., first BI=55555555). The target 304 may transmit (at 369) an ATR_RES PDU that includes the second BI (e.g., second BI=AAAAAAAA). Because the memory corruption at the initiator 302 may render correlated shared secrets and BIs unrecognizable, the initiator 302 may determine (at 371) that a correlation of a shared secret z[AAAAAAA] with the second BI does not exist, and hence, the initiator 302 may determine (at 371) to perform an anonymous key agreement. The target 304 may determine (at 372) a shared secret z[5555555] is associated with the first BI because memory corruption has not occurred at the target 304, and hence, the target 304 may determine (at 372) to perform an associated key agreement.

Because the initiator 302 determines (at 371) to perform an anonymous key agreement, the initiator 302 may determine (at 373) a nonce N, a valid private key s, and a valid public key W using the techniques described above in connection with to FIG. 3A.

Because the target 304 determines (at 372) to perform an associated key agreement, the target 304 may determine (at 374) a nonce N based on the techniques described above in connection with FIG. 3B.

The initiator 302 may transmit (at 375) a first DPS PDU including the $RN_I$ and an $EPCK_I$ that to the target 304. The target 304 may determine (at 376) that while $RN_I$ is included in the first DPS PDU as expected, the $EPCK_I$ is unexpectedly present in the first DPS PDU. The target 304 may implement a bonding signal problem mechanism by transmitting (at 377) a second DPS PDU to the initiator 302 that includes an $RN_T$ but not an EPCK. In certain configurations, the target 304 may implement the bonding signal problem mechanism by sending an empty DPS PDU (not shown in FIG. 3E) to the initiator 302. In certain other configurations, the target 304 may implement the bonding signal problem mechanism by not responding (not shown in FIG. 3E). In certain other configurations, the target 304 may implement the bonding signal problem mechanism by responding with a PDU (not shown in FIG. 3E) containing an error code The initiator 302 may determine (at 378) that the $RN_T$ is present as expected, but that an EPCK is unexpectedly absent from the second DPS PDU. The target 304 may determine (at 379) the shared secret z[5555555] and $K_{ENC}$ using the techniques described above in connection with FIG. 3B.

Hence, the initiator's 302 attempt to perform the anonymous key agreement may fail (at 380), while the target's 304 attempt perform the associated key agreement may succeed (at 381). Because the initiator 302 and the target 304 perform different key agreement procedures, even though the associated key agreement performed by the target 304 succeeds, a communication link may not be established between the initiator 302 and the target 304.

Figure 3F:
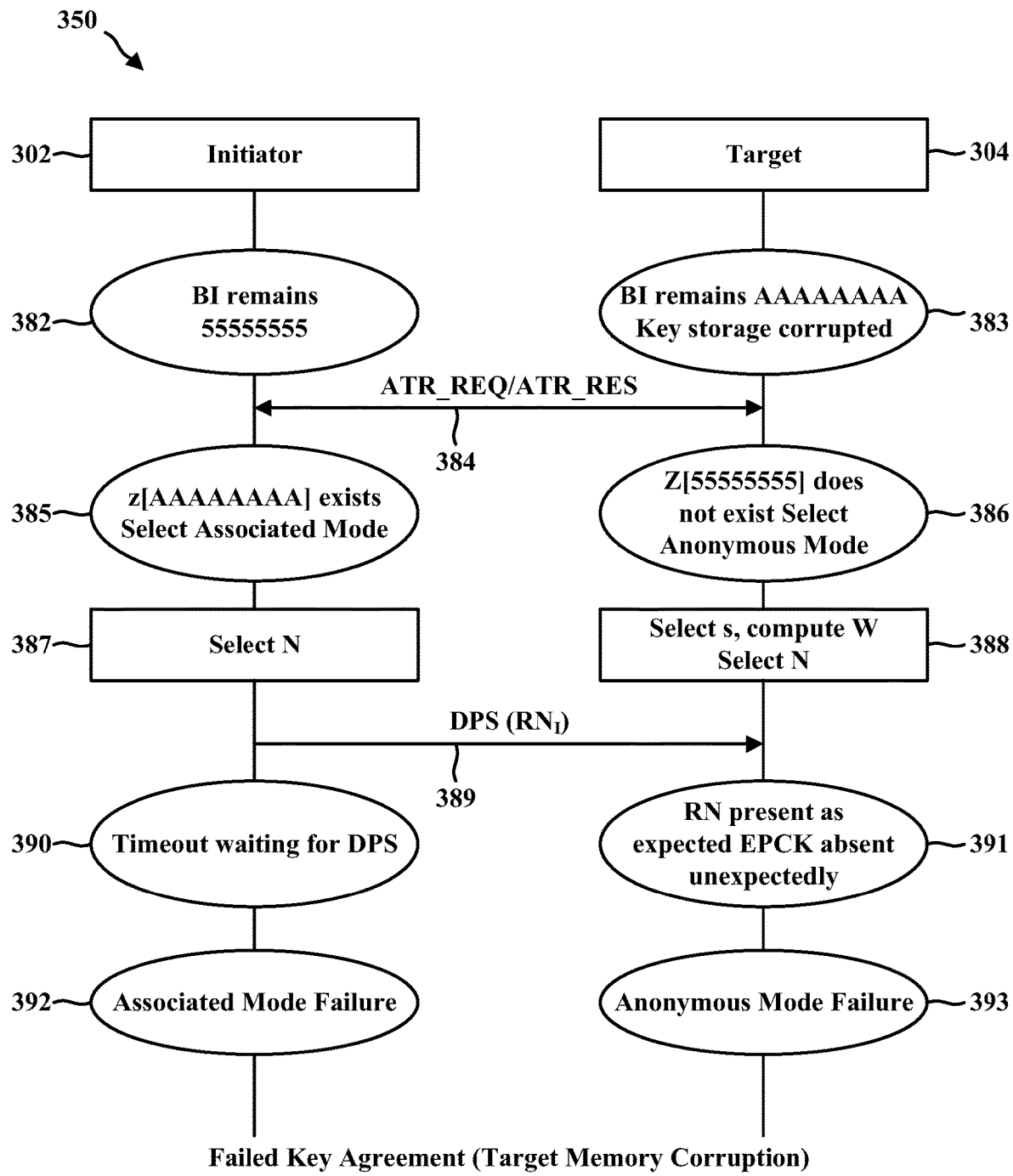
FIG. 3F is a data flow illustrating a failed key agreement due to memory corruption at a target device in accordance with certain aspects of the disclosure.

FIG. 3F is a data flow 350 illustrating a failed key agreement due to memory corruption at a target 304 in accordance with certain aspects of the disclosure.

As seen in FIG. 3F, the first BI associated with the initiator 302 may remain (at 382) the same (e.g., first BI=55555555). The target 304 may experience memory corruption (at 383) such that correlations of BIs and shared secrets from previous key agreement procedures are no longer recognizable, but the second BI may not be corrupted (at 383), and hence, remain the same (e.g., second BI=AAAAAAAA).

The initiator 302 may transmit (at 384) a ATR_REQ PDU that includes the first BI (e.g., first BI=55555555). The target 304 may transmit (at 384) an ATR_RES PDU that includes the second BI (e.g., second BI=AAAAAAAA). Because the memory corruption at the target 304 renders correlated shared secrets and BIs unrecognizable, the target 304 may determine (at 386) that a correlation of a shared secret z[5555555] with the first BI does not exist, and hence, may determine (at 386) to perform an anonymous key agreement. The initiator 302, with an uncorrupted memory, may determine (at 385) that a shared secret z[AAAAAAA] is associated with the second BI, and hence, determine (at 385) to perform an associated key agreement.

Because the initiator 302 determines (at 385) to perform an associated key agreement, the initiator 302 may determine (at 387) a nonce N based on the techniques described above in connection with FIG. 3B.

Because the target 304 determines (at 386) to perform an anonymous key agreement, the target 304 may determine (at 388) a nonce N, a valid private key s, and a valid public key W using the techniques described above in connection with FIG. 3A.

The initiator 302 may transmit (at 389) a DPS PDU including the $RN_I$ that is received by the target 304. The target 304 may determine (at 391) that the presence of $RN_I$ in the DPS PDU is expected, and that a EPCK is unexpectedly absent. The target 304 may implement a bonding problem signal mechanism, and the initiator 302 may timeout (at 390) waiting for a DPS PDU from the target 304. In certain configurations, the target 304 may implement the bonding signal problem mechanism by sending an empty DPS PDU (not shown in FIG. 3F) to the initiator 302. In certain other configurations, the target 304 may implement the bonding signal problem mechanism by not responding (not shown in FIG. 3F). In certain other configurations, the target 304 may implement the bonding signal problem mechanism by responding with a PDU (not shown in FIG. 3F) with at least one term (e.g., EPCK, RN, etc.) absent. In certain other configurations, the target 304 may implement the bonding signal problem mechanism by responding with a PDU (not shown in FIG. 3F) containing an error code.

Hence, the initiator's 302 attempt to perform the associated key agreement may fail (at 392), and the target's 304 attempt perform the anonymous key agreement may succeed (at 393). Because the key agreements performed by the initiator 302 and the target 304 fail, a communication link may not be established between the initiator 302 and the target 304.

Figure 3G:
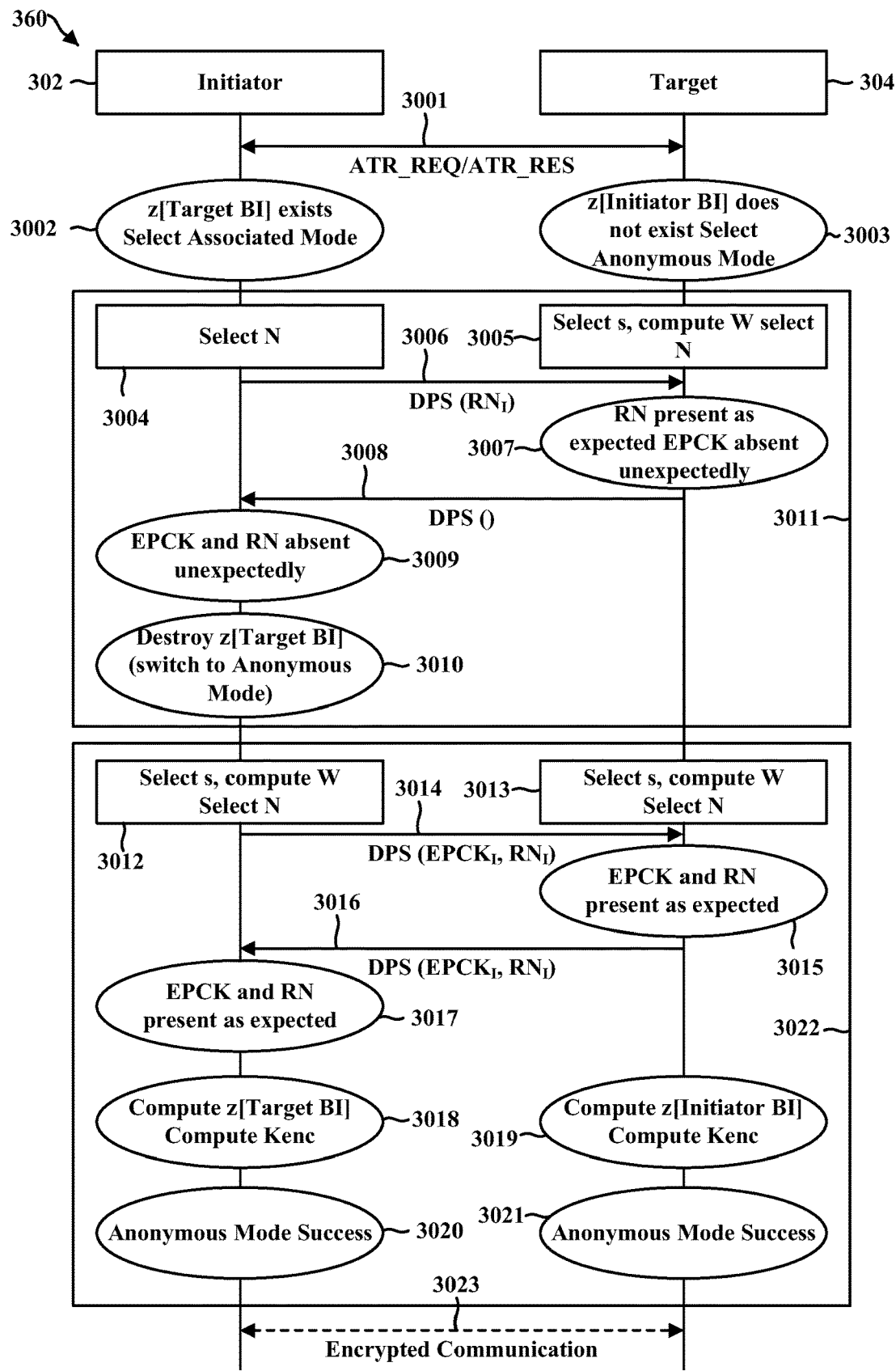
FIG. 3G is a data flow illustrating a key agreement recovery procedure that may be performed during a subsequent communication session after an initiator device undergoes factory reset or after a target device experiences memory corruption in accordance with certain aspects of the disclosure.

FIG. 3G is a data flow 360 illustrating a key agreement recovery procedure that may be performed when an initiator 302 undergoes factory reset or when a target 304 experiences memory corruption in accordance with certain aspects of the disclosure.

As seen in FIG. 3G, an initiator 302 and a target 304 may exchange BIs (e.g., z[Initiator BI] and z[Target B]) (not shown in FIG. 3G) as described above in connection with any of FIGS. 3A-3F. The initiator 302 and the target 304 may also exchange (at 3001) an ATR_REQ PDU and an ATR_RES PDU as described above in connection with any of FIGS. 3A-3F.

The initiator 302 may determine (at 3002) that a shared secret z[Target BI] is correlated with the second BI of the target 304, and hence, the initiator 302 may determine (at 3002) to perform an associated key agreement. However, the target 304 may determine (at 3003) that a shared secret z[Initiator BI] correlated with the first BI of the initiator 302 does not exist, and hence, the target 304 may determine (at 3003) to perform an anonymous key agreement. The operations depicted at 3011 illustrate how the initiator 302 may determine that the target 304 performs an anonymous key agreement rather than an associated key agreement, and switch to anonymous key agreement mode in order to avoid key agreement failure with the target 304.

Because initiator 302 may determine (at 3002) to perform an associated key agreement, the initiator 302 may determine (at 3004) a nonce N based on the techniques described above in connection with FIG. 3B.

Because the target 304 may determine (at 3003) to perform an anonymous key agreement, the target may determine (at 3005) a nonce N, a valid private key s, and a valid public key W using the techniques described above in connection with FIG. 3A.

The initiator 302 may transmit (at 3006) a first DPS PDU that includes an $RN_I$ that is received by the target 304. The target 304 may determine (at 3007) that while an RN is present in the first DPS PDU as expected, an EPCK is unexpectedly absent from the first DPS PDU.

When an EPCK is unexpectedly absent from the first DPS PDU, the target 304 may implement the bonding signal problem mechanism by transmitting (at 3008) an empty second DPS PDU to the initiator 302, by not responding (not shown in FIG. 3G), by responding with a PDU (not shown in FIG. 3G) with at least one term (e.g., EPCK, RN, etc.) absent, or by responding with a PDU (not shown in FIG. 3G) containing an error code. An empty DPS PDU may not include either an RN or a EPCK. The initiator 302 may determine (at 3009) that an RN and an EPCK are unexpectedly absent from the second DPS PDU. Hence, the initiator 3002 may determine (at 3010) that the correlation of a shared secret with the first BI (e.g., z[Initiator B]) is not present at the target 304, and thus, the initiator 302 may destroy and/or remove (at 3010) the correlation of the shared secret with the second BI (e.g., z[Target BI]) in order to perform a key agreement recover procedure/a new anonymous key agreement using the operations depicted at 3022 with the target 304, e.g., using the techniques described above in connection with FIG. 3A.

For example, each of the initiator 302 and the target 304 may determine (at 3012, 3013) a valid set of elliptic curve domain parameters as Curve P-256. Each of the initiator 302 and the target 304 may determine (at 3012, 3013) a valid private key s, associated with the valid set of elliptic curve domain parameters. The valid private key s may be the output of a random or pseudo-random process. Each of the initiator 302 and the target 304 may determine (at 3012, 3013) a public key W=sG, with the sample base point G on Curve P-256. Each of the initiator 302 and the target 304 may determine (at 3012, 3013) a random nonce N as 64 bits of output from a random or pseudo-random process. In certain configurations, the s, W, and N determined (at 3013) by the target 304 may be the information determined at operation 3005.

The initiator 302 may transmit a first PDU (at 3014) to the target 304. In certain configurations, the first PDU may be a DPS PDU. The first DPS PDU may include an $ECPK_I$ parameter that corresponds to the public key W and a $RN_I$ parameter that corresponds to the nonce N, respectively.

When the target 304 determines (at 3015) that the first DPS PDU contains a valid ECPK parameter and a valid RN parameter, the target 304 may extract public key W' and nonce N' from the $ECPK_I$ and $RN_I$ parameter, respectively, and set $N_T$=N and $N_I$=N'.

The target 304 may transmit (at 3016) a second DPS PDU that includes an $ECPK_T$ parameter that corresponds to the public key W and a $RN_T$ parameter that corresponds to the nonce N, respectively. When the initiator 302 determines (at 3017) that the second DPS PDU contains a valid ECPK parameter and a valid RN parameter, and the initiator 302 may extract (at 3017) the public key W' and nonce N' from the $ECPK_T$ and $RN_T$ parameter, respectively, and set $N_I$=N and $N_T$=N'.

When both the first DPS PDU and the second DPS PDU include a valid ECPK and a valid RN parameter, the initiator 302 and the target 304 may each determine (at 3018, 3019) an elliptic curve point P=sW', associated with the valid set of elliptic curve domain parameters, and may determine (at 3018, 3019) the shared secret value z (e.g., z[AAAAAAAA] and z[55555555] is equal to $x_p$, $x_p$ is the x-coordinate of P.

The initiator 302 and/or the target 304 may determine (at 3018, 3019) K=$N_I$∥$N_T$, which may be a concatenation of the nonces exchanged in the first DPS PDU and the second DPS PDU. In certain configurations, K may be a 128-bit key.

The initiator 302 and the target 304 may determine (at 3018, 3019) an encrypted key Kenc using an authentication algorithm AES-CMAC, K described above, and z, such that Kenc=AES-CMACK(z).

The initiator 302 and the target 304 may initialize a respective Send Packet Counter PC(S) and Receive Packet Counter PC(R) to zero. The initiator 302 and the target may destroy the private key s. If both the initiator 302 and the target 304 transmit the BI parameter and the OPT parameter with BM bit set to one, then the initiator 302 and the target 304 may maintain the shared secret value z for future associated key agreement with the other device by correlating the secret value z with the received BI parameter value of the other device.

As seen in FIG. 3G, the initiator 302 and the target 304 may determine (at 3020, 3021) that anonymous key agreement is successful, and encrypted communication may be performed (at 3023) between the initiator 302 and the target 304. Using the techniques described above in connection with FIG. 3G, a system of the present disclosure may avoid key agreement failure when the initiator under goes factory reset or the target experiences memory corruption.

Figure 3H:
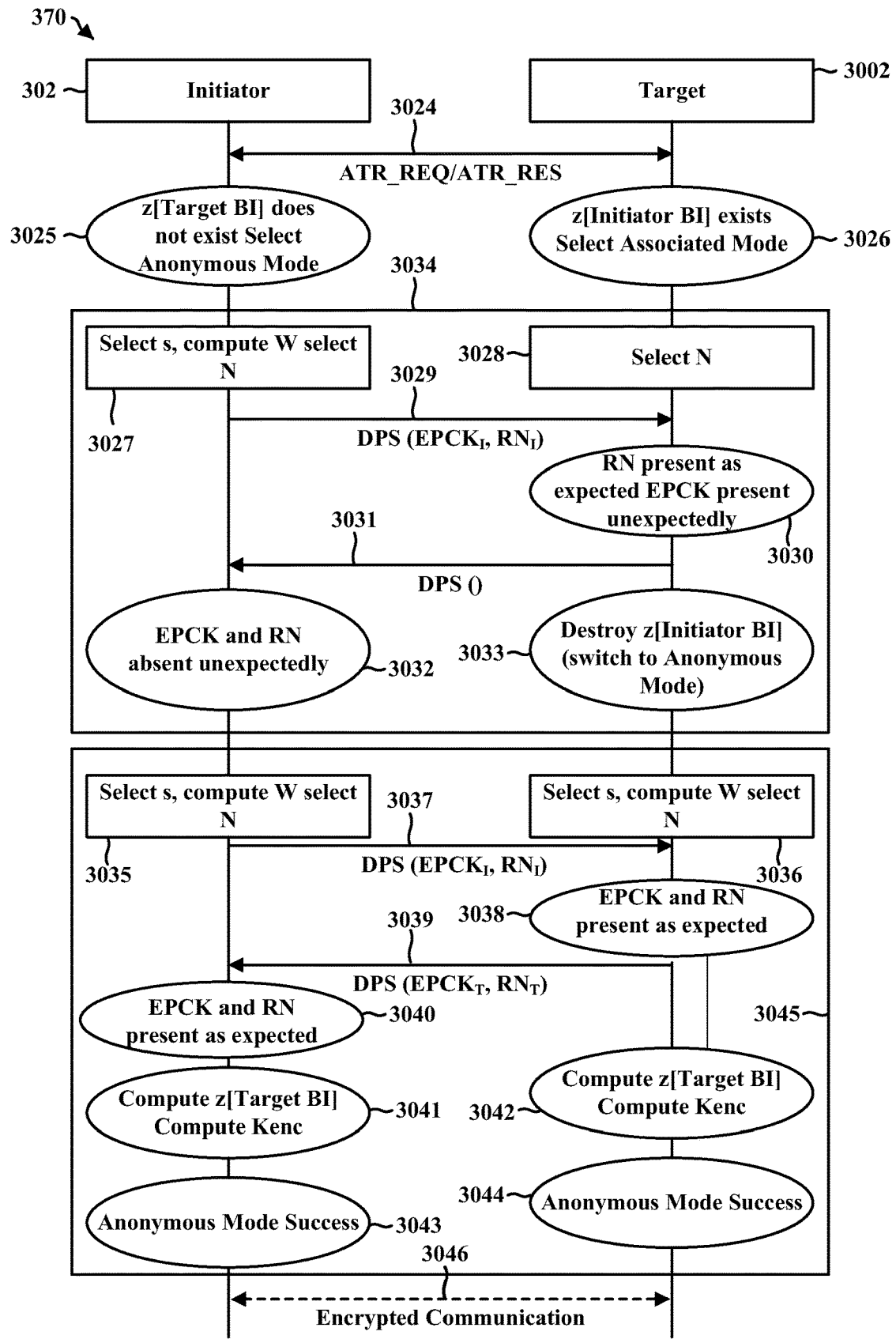
FIG. 3H is a data flow illustrating a key agreement recovery procedure that may be performed during a subsequent communication session after an initiator device experiences memory corruption or after a target device undergoes a factory reset in accordance with certain aspects of the disclosure.

FIG. 3H is a data flow 370 illustrating a key agreement recovery procedure that may be performed when an initiator 302 memory corruption or when a target 304 undergoes a factory reset in accordance with certain aspects of the disclosure.

As seen in FIG. 3H, an initiator 302 and a target 304 may exchange BIs (e.g., z[Initiator BI] and z[Target BI]) (not shown in FIG. 3H) as described above in connection with any of FIGS. 3A-3G. The initiator 302 and the target 304 may also exchange (at 3024) an ATR_REQ PDU and an ATR_RES PDU as described above in connection with any of FIGS. 3A-3F.

The initiator 302 may determine (at 3025) that a shared secret z[Target BI] correlated with the second BI is not maintained by the initiator 302, and hence, the initiator may determine (at 3025) to perform an anonymous key agreement with the target 304. However, the target 304 may determine (at 3026) that a shared secret z[Initiator BI] correlated with the first BI is maintained by the target 304, and hence, the target 304 may determine (at 3026) to perform an associated key agreement with the initiator 302. The operations depicted at 3034 illustrate how the target 304 may determine that the initiator performs an anonymous key agreement rather than an associated key agreement, and switch to anonymous key agreement mode in order to avoid key agreement failure with the initiator 302.

Because the initiator 302 determines (at 3025) to perform an anonymous key agreement, the initiator 302 may determine (at 3027) a nonce N, a valid private key s, and a valid public key W using the techniques described above with reference to FIG. 3A.

Because the target 304 determines (at 3026) to perform an associated key agreement procedure, the target 304 may determine (at 3028) a nonce N based on the techniques described above with reference to FIG. 3B.

The initiator 302 may transmit (at 3029) a first DPS PDU that includes an $RN_I$ and an $EPCK_I$ to the target 304. The target 304 may determine (at 3030) that while an RN is present in the first DPS PDU as expected, an EPCK is unexpectedly present in the first DPS PDU. Hence, the target 304 may implement a bonding problem signal mechanism by transmitting (at 3031) an empty second DPS PDU to the initiator 302, by not responding (not shown in FIG. 3H), by responding with a PDU (not shown in FIG. 3H) with at least one term (e.g., EPCK, RN, etc.) absent, or by responding with a PDU (not shown in FIG. 3H) containing an error code. An empty DPS PDU may not include either an RN or an EPCK. The target 304 may destroy and/or remove (at 3033) the correlation between the shared secret and the first BI in order to perform a new anonymous key agreement using the operations depicted at 3045 with the initiator 302, e.g., using the techniques described above in connection with FIG. 3A.

For example, each of the initiator 302 and the target 304 may determine (at 3035, 3036) a valid set of elliptic curve domain parameters as Curve P-256. Each of the initiator 302 and the target 304 may determine (at 3035, 3036) a valid private key s, associated with the valid set of elliptic curve domain parameters. The valid private key s may be the output of a random or pseudo-random process. Each of the initiator 302 and the target 304 may determine (at 3035, 3036) a public key W=sG, with the sample base point G on Curve P-256. Each of the initiator 302 and the target 304 may determine (at 3035, 3036) a random nonce N as 64 bits of output from a random or pseudo-random process. In certain configurations, the s, W, and N determined (at 3035) by the initiator 302 may be the information determined at operation 3027.

The initiator 302 may transmit a first PDU (at 3037) to the target 304. In certain configurations, the first PDU may be a DPS PDU. The first DPS PDU may include an $ECPK_I$ parameter that corresponds to the public key W and a $RN_I$ parameter that corresponds to the nonce N, respectively.

When the target 304 determines (at 3038) that the first DPS PDU contains a valid ECPK parameter and a valid RN parameter, the target 304 may extract (at 3038) public key W' and nonce N' from the $ECPK_I$ and $RN_I$ parameter, respectively, and set $N_T$=N and $N_I$=N'.

The target 304 may transmit (at 3039) a second DPS PDU that includes an $ECPK_T$ parameter that corresponds to the public key W and a $RN_T$ parameter that corresponds to the nonce N, respectively. When the initiator 302 determines (at 3040) that the second DPS PDU contains a valid ECPK parameter and a valid RN parameter, and the initiator 302 may extract (at 3040) the public key W' and nonce N' from the $ECPK_T$ and $RN_T$ parameter, respectively, and set $N_I$=N and $N_T$=N'.

When both the first DPS PDU and the second DPS PDU include a valid ECPK and a valid RN parameter, the initiator 302 and the target 304 may each determine (at 3041, 3042) an elliptic curve point P=sW', associated with the valid set of elliptic curve domain parameters, and may determine (at 3041, 3042) the shared secret value z (e.g., z[AAAAAAAA] and z[55555555] is equal to $x_p$, $x_p$ is the x-coordinate of P.

The initiator 302 and/or the target 304 may determine (at 3041, 3042) K=$N_I$||$N_T$, which may be a concatenation of the nonces exchanged in the first DPS PDU and the second DPS PDU. In certain configurations, K may be a 128-bit key.

The initiator 302 and the target 304 may determine (at 3041, 3042) an encrypted key Kenc using an authentication algorithm AES-CMAC, K described above, and z, such that Kenc=AES-CMACK(z).

The initiator 302 and the target 304 may initialize a respective Send Packet Counter PC(S) and Receive Packet Counter PC(R) to zero. The initiator 302 and the target may destroy the private key s. If both the initiator 302 and the target 304 transmit the BI parameter and the OPT parameter with BM bit set to one, then the initiator 302 and the target 304 may maintain the shared secret value z for future associated key agreement with the other device by correlating the secret value z with the received BI parameter value of the other device.

As seen in FIG. 3H, the initiator 302 and the target 304 may determine (at 3043, 3044) that anonymous key agreement is successful, and encrypted communication may be performed (at 3046) between the initiator 302 and the target 304. Using the techniques described above in connection with FIG. 3H, a system of the present disclosure may avoid key agreement failure when the initiator experiences memory corruption or the target under goes factory reset.

Figure 4A:
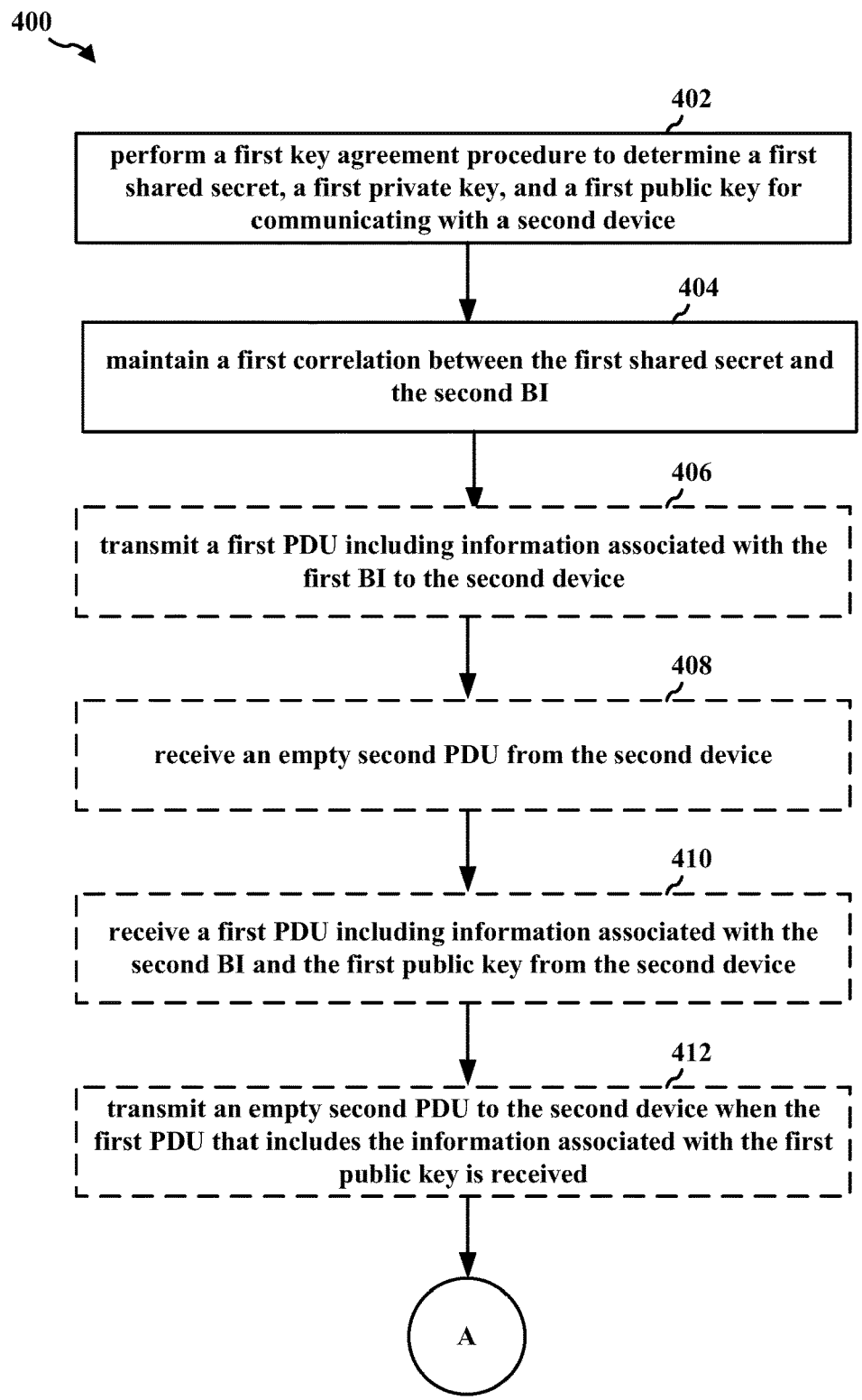
FIGS. 4A and 4B are a flowchart of a method of wireless communication.
Figure 4B:
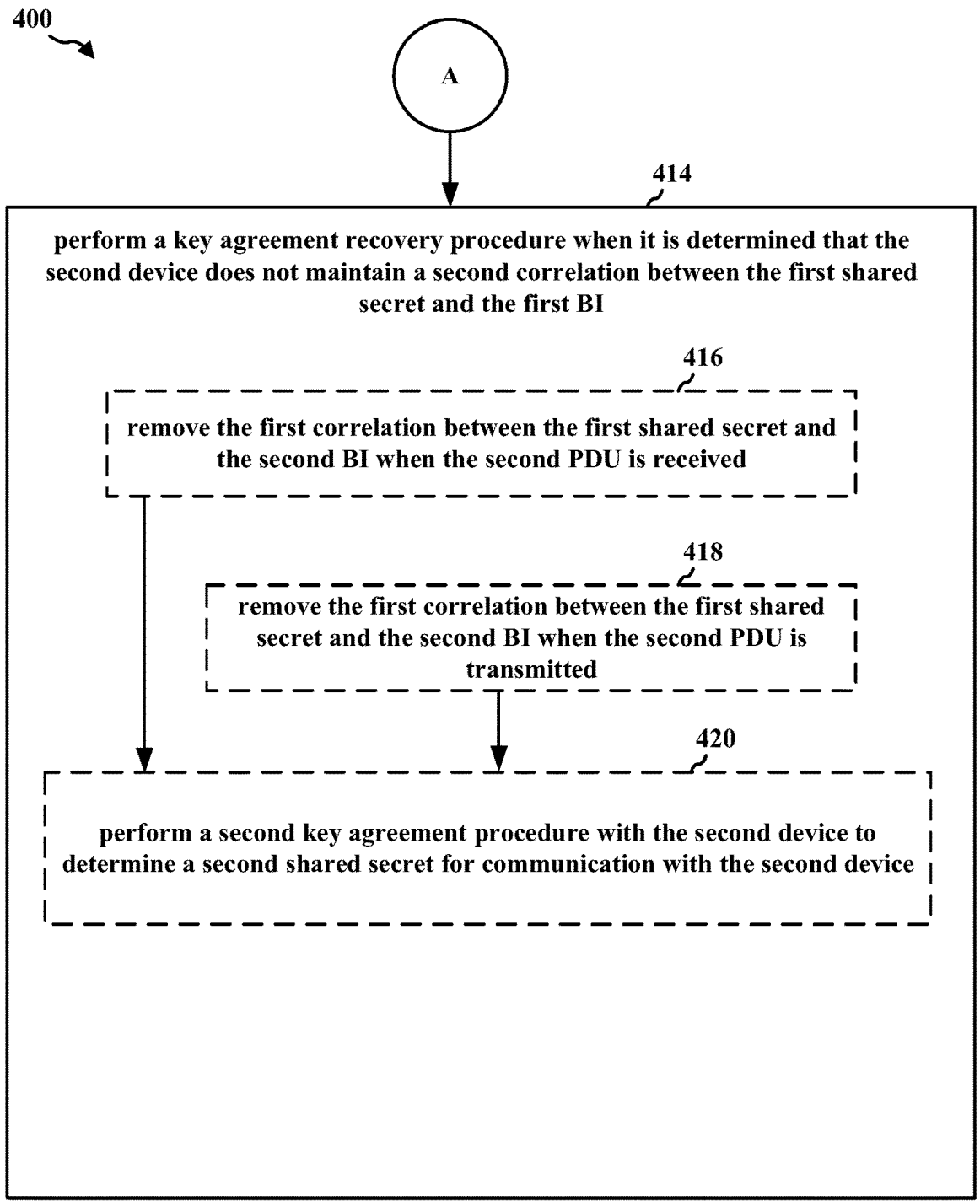

FIGS. 4A and 4B are a flowchart 400 of a method of wireless communication. The method may be performed by a first device (e.g., the transmitter 104, the receiver 108, the initiator 302, the target 304, the apparatus 502/502'). In FIGS. 4A and 4B, optional operations are indicated with dashed links. Operations 402, 404, 414, and 420 may be associated with a key agreement recovery procedure that is performed when either the initiator under goes factory reset (e.g., see FIG. 3G), the target experiences memory corruption (e.g., see FIG. 3G), the initiator experiences memory corruption (e.g., see FIG. 3H), or the target under goes factory reset (e.g., see FIG. 3H). Operations 406, 408, and 416 may be associated with a key agreement recovery procedure that is performed when either the initiator under goes factory reset (e.g., see FIG. 3G), or the target experiences memory corruption (e.g., see FIG. 3G). Operations 410, 412, and 418 may be associated with a key agreement recovery procedure that is performed when either the initiator experiences memory corruption (e.g., see FIG. 3H), or the target under goes factory reset (e.g., see FIG. 3H). That is when operations 406, 408, and 416 are performed operations 410, 412, and 418 may not be performed. When operations 410, 412, and 418 are performed, operations 406, 408, and 416 may not be performed.

At 402, the first device (e.g., either the initiator 302 or the target 304) may perform a first key agreement procedure to determine a first shared secret for communicating with a second device. In one aspect, the first shared secret may be associated with first BI of the first device and a second BI of the second device. For example, referring to FIG. 3A, the initiator 302 may determine (at 306) a shared secret (e.g., No z[Target BI]) based at least in part on the second BI associated with the target 304. The target 304 may determine (at 307) the shared secret (e.g., No z[Initiator BI]) based at least in part on the first BI associated with the initiator 302.

At 404, the first device may maintain a first correlation between the first shared secret and the second BI. For example, referring to FIG. 3A, the initiator 302 may maintain the shared secret (e.g., No z[Target BI]) determined (at 306) based at least in part on the second BI. The target 304 may maintain the shared secret (e.g., No z[Initiator BI]) determined (at 307) based at least in part on the first BI that is maintained by the target 304.

At 406, the first device may transmit a first PDU to the second device. In one aspect, the first PDU may include information associated with the first BI. For example, referring to FIG. 3C, if the initiator 302 (e.g., first device) possesses a pre-established shared secret z[Target BI] for the target's 304 BI parameter value, but the target (e.g., second device) no longer possesses a shared secret z[Initiator BI] for the initiator's 302 BI parameter value, a subsequent key agreement may be fail as described above in connection with FIG. 3C. The initiator 302 may avoid key agreement failure by using the techniques described above in connection with FIG. 3G, the initiator 302 may send a DPS PDU (at 3006) with only the RN parameter, but the target 304 may be expecting both EPCK and RN parameters. The target 304 may detect (at 3007) the missing EPCK parameter from the initiator 302, and may abort the subsequent key agreement procedure after implementing a bonding problem signal mechanism by returning an empty DPS PDU (at 3008) to the initiator 302, by not responding (not shown in FIG. 3G), by responding with a PDU (not shown in FIG. 3G) with at least one term (e.g., EPCK, RN, etc.) absent, or by responding with a PDU (not shown in FIG. 3G) containing an error code. The target 304 may attempt to perform anonymous key agreement again as described in FIG. 3A. The initiator 302 may detect (at 3009) the empty DPS PDU from the target 304, and may abort the associated key agreement procedure after destroying (at 3010) the shared secret z for the target's 304 BI parameter value. The initiator 302 may attempt another anonymous key agreement as described in FIG. 3A because neither device now possesses a pre-established shared secret z for the other device's BI parameter value. Additional details associated with operation 406 are described above in connection with FIG. 3G.

At 408, the first device may receive a second PDU from the second device. In one aspect. In certain aspects, the second PDU may be an empty PDU. For example, referring to FIG. 3G, the target 304 may detect (at 3007) the missing EPCK parameter from the initiator 302, and may abort the subsequent key agreement procedure after returning an empty DPS PDU (at 3008) to the initiator 302.

At 410, the first device may receive a first PDU from the second device. In one aspect, the first PDU may include information associated with the second BI and the first public key. For example, referring to FIG. 3H, if the target 304 (e.g., first device) possesses a pre-established shared secret z[Initiator BI] for the initiator's 302 (e.g., second device) BI parameter value, but the initiator 302 no longer possesses one for the target's 304 BI parameter value, the associated key agreement procedure performed by the target 304 and the anonymous key agreement performed by the initiator 302 may be fail. The initiator 302 may send (at 3029) a first DPS PDU with both the EPCK and RN parameters, but the target 304 may be expecting only the RN parameter. The target 304 may detect (at 3030) the unexpected EPCK parameter from the initiator 302, may implement a bonding problem signal mechanism by returning an empty DPS PDU (at 3031), by not responding(not shown in FIG. 3H), by responding with a PDU (not shown in FIG. 3H) with at least one term (e.g., EPCK, RN, etc.) absent, or by responding with a PDU (not shown in FIG. 3H) containing an error code, and may abort key agreement after destroying (at 3033) the shared secret z[Initiator BI] for the initiator's 302 BI parameter value. The initiator 302 may detect (at 3032) the empty DPS PDU from the target 304, and may abort the subsequent key agreement procedure. The initiator 302 and the target 304 may then attempt a new anonymous key agreement again as described above in connection with the because neither device now possesses a pre-established shared secret z for the remote device's BI parameter value.

At 412, the first device may transmit an empty second PDU to the second device when the first PDU that includes the information associated with the first public key is received. For example, referring to FIG. 3H, the target 304 may detect (at 3030) the unexpected EPCK parameter from the initiator 302, and may return an empty DPS PDU (at 3031).

Referring to FIG. 4B, at 414, the first device may perform a key agreement recovery procedure when it is determined that the second device does not maintain a second correlation between the first shared secret and the first BI. For example, referring to FIGS. 3G and 3H, a key agreement recovery procedure may be performed (at 3010, 3022, 3033, and 3045) when one of the initiator 302 (see FIG. 3G) or the target 304 (see FIG. 3H) do not maintain a shared secret z associated with the other device's BI.

At 416, the first device may perform the key agreement recovery procedure when it is determined that the second device does not maintain the second correlation between the first shared secret and the first BI by removing the first correlation between the first shared secret and the second BI when the second PDU is received. For example, referring to FIG. 3G, the initiator 302 may detect the empty DPS PDU from the target 304, and may abort the subsequent key agreement procedure after destroying (at 3010) the shared secret z for the target's BI parameter value.

At 418, the first device may perform the key agreement recovery procedure when it is determined that the second device does not maintain the second correlation between the first shared secret and the first BI by removing the first correlation between the first shared secret and the second BI when the second PDU (e.g., an empty DPS PDU) is transmitted. For example, referring to FIG. 3H, the target 304 may detect (at 3030) the unexpected EPCK parameter from the initiator 302, may return an empty DPS PDU (at 3031), and may destroy (at 3033) the shared secret z[Initiator BI] for the initiator's 302 BI parameter value.

At 420, the first device may perform the key agreement recovery procedure when it is determined that the second device does not maintain the second correlation between the first shared secret and the first BI by performing a second key agreement procedure with the second device to determine a second shared secret for communicating with the second device. In certain configurations, referring to FIG. 3G, a key agreement recovery procedure may be performed (at 3022) when the initiator 302 destroys the first shared secret (e.g., z[Target BI]) determine from a prior anonymous key agreement procedure with the target 304. In certain other configurations, referring to FIG. 3H, a key agreement recovery procedure may be performed (at 3045) when the target 304 destroys the first shared secret (e.g., z[Initiator BI]) determine from a prior anonymous key agreement procedure with the target 304.

Figure 5:
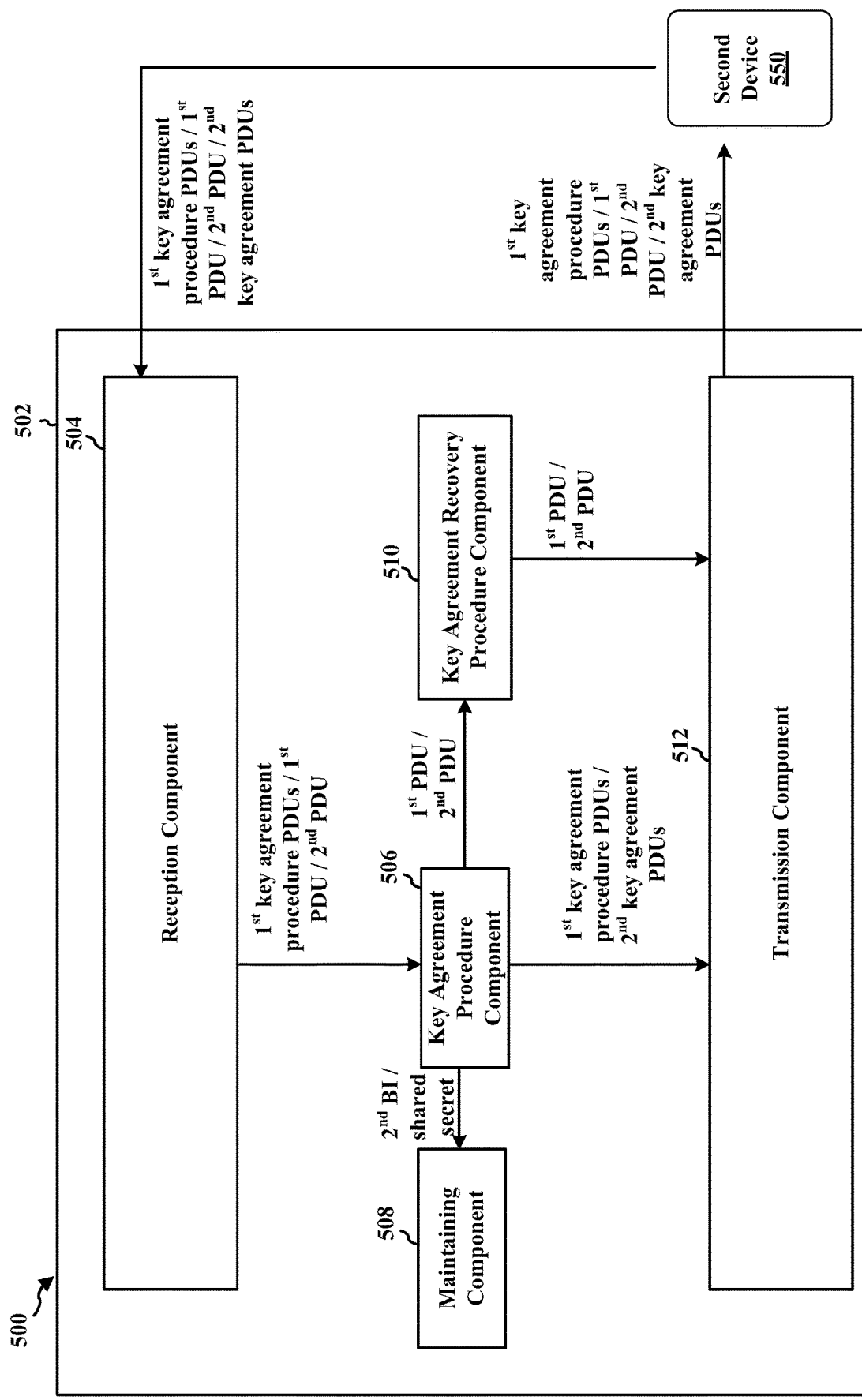
FIG. 5 is a conceptual data flow diagram illustrating the data flow between different means/components in an exemplary apparatus.

FIG. 5 is a conceptual data flow diagram 500 illustrating the data flow between different means/components in an exemplary apparatus 502. The apparatus may be a first device (e.g., the transmitter 104, the receiver 108, the initiator 302, the target 304, the apparatus 502') in communication with a second device 550 (e.g., the transmitter 104, the receiver 108, the initiator 302, the target 304).

The apparatus may include a reception component 504, a key agreement procedure component 506, a maintaining component 508, a key agreement recovery procedure component 510, and a transmission component 512.

The key agreement procedure component 506 may send a signal associated with one or more first key agreement procedure PDUs to the transmission component 512. The transmission component 512 may be configured to transmit the one or more first key agreement procedure PDUs to the second device 550. The reception component 504 may be configured to receive one or more first key agreement procedure PDUs from the second device 550. One or more of the reception component 504, the key agreement procedure component 506, and/or the transmission component 512 may be configured to perform a first key agreement procedure to determine a first shared secret for communicating with a second device. In one aspect, the first shared secret may be associated with first BI of the first device and a second BI of the second device.

The reception component 504 may be configured to send a signal associated with one or more of the received first key agreement procedure PDUs to the key agreement procedure component 506. The key agreement procedure component 506 may be configured to send a signal associated with the second BI and the shared secret to the maintaining component 508. The maintaining component 508 may be configured to maintain a first correlation between the first shared secret and the second BI.

The transmission component 512 may be configured to transmit a first PDU to the second device 550. In one aspect, the first PDU may include information associated with the first BI. The reception component 504 may be configured to receive a second PDU from the second device 550. In one aspect, the second PDU may be an empty PDU. The reception component 504 may be configured to send a signal associated with the empty second PDU to the key agreement procedure component 506. The key agreement procedure component 506 may be configured to send a signal associated with the empty second PDU to the key agreement recovery procedure component 510.

The key agreement recovery procedure component 510 may be configured to perform a key agreement recovery procedure when it is determined that the second device does not maintain a second correlation between the first shared secret and the first BI (e.g., based on the receipt of the empty PDU). In certain configurations, the key agreement recovery procedure component 510 and/or the maintaining component 508 may be configured to perform a key agreement recovery procedure when it is determined that the second device does not maintain a second correlation between the first shared secret and the first BI by removing the first correlation between the first shared secret and the second BI when the second PDU is received. In one aspect, the second shared secret may be associated with the first BI of the first device and the second BI of the second device.

The reception component 504 may be configured to receive a first PDU from the second device. In one aspect, the first PDU may include information associated with the second BI and a first public key. The reception component 504 may be configured to send a signal associated with the first PDU to the key agreement procedure component 506. The key agreement procedure component 506 may be configured to send a signal associated with the first PDU to the key agreement recovery procedure component 510. The key agreement recovery procedure component 510 may be configured to send a signal associated with an empty second PDU to the transmission component 512. The transmission component 512 may be configured to transmit an empty second PDU to the second device 550 when the first PDU that includes the information associated with the first public key is received.

The key agreement recovery procedure component 510 may be configured to perform the key agreement recovery procedure when it is determined that the second device does not maintain the second correlation between the first shared secret and the first BI by removing the first correlation between the first shared secret and the second BI when the second PDU is transmitted. In certain configurations, the maintaining component 508 and/or the key agreement recovery procedure component 510 may be configured to perform the key agreement recovery procedure when it is determined that the second device does not maintain the second correlation between the first shared secret and the first BI by performing a second key agreement procedure with the second device to determine a second shared secret for communicating with the second device. In certain aspects, the second shared secret may be associated with first BI of the first device and the second BI of the second device.

The apparatus may include additional components that perform each of the blocks of the algorithm in the aforementioned flowcharts of FIGS. 4A and 4B. As such, each block in the aforementioned flowcharts of FIGS. 4A and 4B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 6:
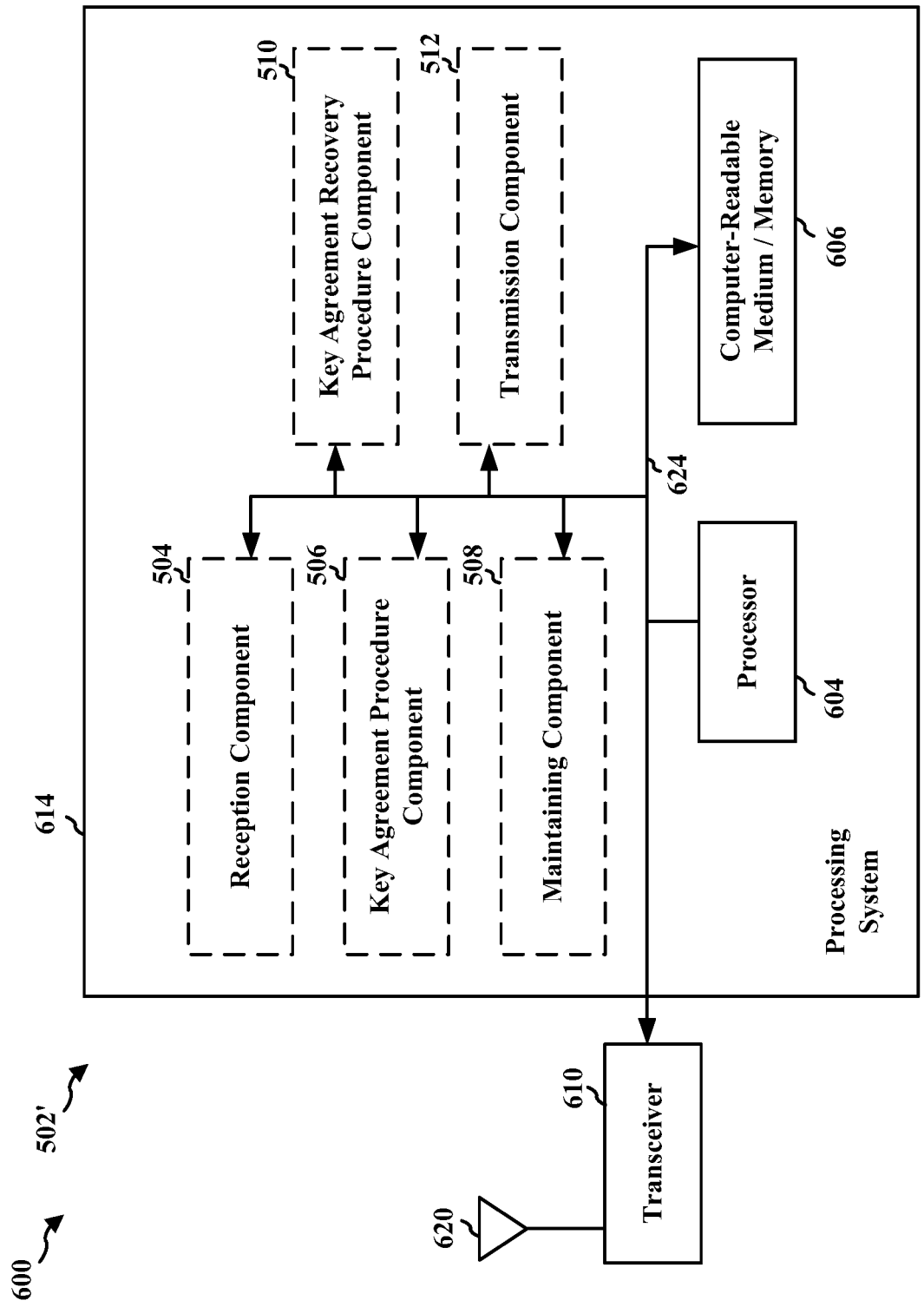
FIG. 6 is a diagram illustrating an example of a hardware implementation for an apparatus employing a processing system.

FIG. 6 is a diagram 600 illustrating an example of a hardware implementation for an apparatus 502' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the components 504, 506, 508, 510, 512 and the computer-readable medium/memory 606. The bus 624 may also link various other circuits such as timing sources, peripherals, voltage regulators, and power management circuits, which are well known in the art, and therefore, will not be described any further.

The processing system 614 may be coupled to a transceiver 610. The transceiver 610 is coupled to one or more antennas 620. The transceiver 610 provides a means for communicating with various other apparatus over a transmission medium. The transceiver 610 receives a signal from the one or more antennas 620, extracts information from the received signal, and provides the extracted information to the processing system 614, specifically the reception component 504. In addition, the transceiver 610 receives information from the processing system 614, specifically the transmission component 512, and based on the received information, generates a signal to be applied to the one or more antennas 620. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system 614 further includes at least one of the components 504, 506, 508, 510, 512. The components may be software components running in the processor 604, resident/stored in the computer readable medium/memory 606, one or more hardware components coupled to the processor 604, or some combination thereof.

In certain configurations, the apparatus 502/502' for wireless communication may include means for performing a first key agreement procedure to determine a first shared secret for communicating with a second device. In one aspect, the first shared secret may be associated with first BI of the first device and a second BI of the second device. In certain other configurations, the apparatus 502/502' for wireless communication may include means for maintaining a first correlation between the first shared secret and the second BI. In certain other configurations, the apparatus 502/502' for wireless communication may include means for transmitting a first PDU to the second device. In one aspect, the first PDU may include information associated with the first BI. In certain other configurations, the apparatus 502/502' for wireless communication may include means for receiving a second PDU from the second device. In one aspect. In certain aspects, the second PDU may be an empty PDU. In certain other configurations, the apparatus 502/502' for wireless communication may include means for receiving a first PDU from the second device. In one aspect, the first PDU may include information associated with the second BI and the first public. key. In certain other configurations, the apparatus 502/502' for wireless communication may include means for transmitting an empty second PDU to the second device when the first PDU that includes the information associated with the first public key is received. In certain other configurations, the apparatus 502/502' for wireless communication may include means for performing a key agreement recovery procedure when it is determined that the second device does not maintain a second correlation between the first shared secret and the first BI. In certain aspects, the means for performing a key agreement recovery procedure when it is determined that the second device does not maintain a second correlation between the first shared secret and the first BI may be configured to remove the first correlation between the first shared secret and the second BI when the second PDU is received. In certain other aspects, the means for performing a key agreement recovery procedure when it is determined that the second device does not maintain a second correlation between the first shared secret and the first BI may be configured to remove the first correlation between the first shared secret and the second BI when the second PDU is transmitted. In certain other aspects, the means for performing a key agreement recovery procedure when it is determined that the second device does not maintain a second correlation between the first shared secret and the first BI may be configured to perform a second key agreement procedure with the second device to determine a second shared secret for communicating with the second device. The aforementioned means may be one or more of the aforementioned components of the apparatus 502 and/or the processing system 614 of the apparatus 502' configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a first device, comprising:
    performing a first key agreement procedure to determine a first shared secret for communicating with a second device, the first shared secret being associated with a first bonding identifier (BI) of the first device and a second BI of the second device;
    maintaining a first correlation between the first shared secret and the second BI; and
    performing a key agreement recovery procedure when the first device determines based on an unexpected status of a protocol data unit (PDU) that the second device does not maintain a second correlation between the first shared secret and the first BI, wherein the key agreement recovery procedure comprises a different type of key agreement procedure than the first key agreement procedure.

2. The method of claim 1, further comprising:
    transmitting a first PDU to the second device, the first PDU including information associated with the first BI; and
    receiving a second PDU from the second device, the second PDU being an empty PDU.

3. The method of claim 2, wherein performing the key agreement recovery procedure when the first device determines that the second device does not maintain the second correlation between the first shared secret and the first BI comprises:
    removing the second correlation between the first shared secret and the second BI when the second PDU is received; and
    performing a second key agreement procedure with the second device to determine a second shared secret for communicating with the second device.

4. The method of claim 1, further comprising:
    receiving a first PDU from the second device, the first PDU including information associated with the second BI and a public key; and
    transmitting a second PDU to the second device when the first PDU that includes the information associated with the public key is received, the second PDU being an empty PDU.

5. The method of claim 4, wherein performing the key agreement recovery procedure when the first device determines that the second device does not maintain the second correlation between the first shared secret and the first BI comprises:
    removing the second correlation between the first shared secret and the second BI when the second PDU is transmitted; and
    performing a second key agreement procedure with the second device to determine a second shared secret for communicating with the second device, the second shared secret being associated with the first BI of the first device and the second BI of the second device.

6. An apparatus for wireless communication for a first device, comprising:
    means for performing a first key agreement procedure to determine a first shared secret for communicating with a second device, the first shared secret being associated with a first bonding identifier (BI) of the first device and a second BI of the second device;
    means for maintaining a first correlation between the first shared secret and the second BI; and
    means for performing a key agreement recovery procedure when the first device determines based on an unexpected status of a protocol data unit (PDU) that the second device does not maintain a second correlation between the first shared secret and the first BI, wherein the key agreement recovery procedure comprises a different type of key agreement procedure than the first key agreement procedure.

7. The apparatus of claim 6, further comprising:
    means for transmitting a first PDU to the second device, the first PDU including information associated with the first BI; and
    means for receiving a second PDU from the second device, the second PDU being an empty PDU.

8. The apparatus of claim 7, wherein the means for performing the key agreement recovery procedure when the first device determines that the second device does not maintain the second correlation between the first shared secret and the first BI is configured to:
    remove the second correlation between the first shared secret and the second BI when the second PDU is received; and
    perform a second key agreement procedure with the second device to determine a second shared secret for communicating with the second device.

9. The apparatus of claim 6, further comprising:
    means for receiving a first PDU from the second device, the first PDU including information associated with the second BI and a public key; and
    means for transmitting a second PDU to the second device when the first PDU that includes the information associated with the public key is received, the second PDU being an empty PDU.

10. The apparatus of claim 9, wherein the means for performing the key agreement recovery procedure when the first device determines that the second device does not maintain the second correlation between the first shared secret and the first BI is configured to:
    remove the second correlation between the first shared secret and the second BI when the second PDU is transmitted; and
    perform a second key agreement procedure with the second device to determine a second shared secret for communicating with the second device, the second shared secret being associated with the first BI of the first device and the second BI of the second device.

11. An apparatus for wireless communication for a first device, comprising:
    a memory; and
    at least one processor coupled to the memory and configured to:
    perform a first key agreement procedure to determine a first shared secret for communicating with a second device, the first shared secret being associated with a first bonding identifier (BI) of the first device and a second BI of the second device;
    maintain a first correlation between the first shared secret and the second BI; and
    perform a key agreement recovery procedure when the first device determines based on an unexpected status of a protocol data unit (PDU) that the second device does not maintain a second correlation between the first shared secret and the first BI, wherein the key agreement recovery procedure comprises a different type of key agreement procedure than the first key agreement procedure.

12. The apparatus of claim 11, wherein the at least one processor is further configured to:
transmit a first PDU to the second device, the first PDU including information associated with the first BI; and
receive a second PDU from the second device, the second PDU being an empty PDU.

13. The apparatus of claim 12, wherein the at least one processor is configured to perform the key agreement recovery procedure when the first device determines that the second device does not maintain the second correlation between the first shared secret and the first BI by:
removing the second correlation between the first shared secret and the second BI when the second PDU is received; and
performing a second key agreement procedure with the second device to determine a second shared secret for communicating with the second device.

14. The apparatus of claim 11, wherein the at least one processor is further configured to:
receive a first PDU from the second device, the first PDU including information associated with the second BI and a public key; and
transmit a second PDU to the second device when the first PDU that includes the information associated with the public key is received, the second PDU being an empty PDU.

15. The apparatus of claim 14, wherein the at least one processor is configured to perform the key agreement recovery procedure when the first device determines that the second device does not maintain the second correlation between the first shared secret and the first BI by:
removing the second correlation between the first shared secret and the second BI when the second PDU is transmitted; and
performing a second key agreement procedure with the second device to determine a second shared secret for communicating with the second device, the second shared secret being associated with the first BI of the first device and the second BI of the second device.

16. A non-transitory computer-readable medium comprising computer executable code for a first device, comprising code to:
perform a first key agreement procedure to determine a first shared secret for communicating with a second device, the first shared secret being associated with first bonding identifier (BI) of the first device and a second BI of the second device;
maintain a first correlation between the first shared secret and the second BI; and
perform a key agreement recovery procedure when the first device determines based on an unexpected status of a protocol data unit (PDU) that the second device does not maintain a second correlation between the first shared secret and the first BI, wherein the key agreement recovery procedure comprises a different type of key agreement procedure than the first key agreement procedure.

17. The non-transitory computer-readable medium of claim 16, further comprising code to:
transmit a first PDU to the second device, the first PDU including information associated with the first BI; and
receive a second PDU from the second device, the second PDU being an empty PDU.

18. The non-transitory computer-readable medium of claim 17, wherein the code to perform the key agreement recovery procedure when the first device determines that the second device does not maintain the second correlation between the first shared secret and the first BI is configured to:
remove the second correlation between the first shared secret and the second BI when the second PDU is received; and
perform a second key agreement procedure with the second device to determine a second shared secret for communicating with the second device.

19. The non-transitory computer-readable medium of claim 16, further comprising code to:
receive a first PDU from the second device, the first PDU including information associated with the second BI and a public key; and
transmit a second PDU to the second device when the first PDU that includes the information associated with the public key is received, the second PDU being an empty PDU.

20. The non-transitory computer-readable medium of claim 19, wherein the code to perform the key agreement recovery procedure when the first device determines that the second device does not maintain the second correlation between the first shared secret and the first BI is configured to:
remove the second correlation between the first shared secret and the second BI when the second PDU is transmitted; and
perform a second key agreement procedure with the second device to determine a second shared secret for communicating with the second device, the second shared secret being associated with the first BI of the first device and the second BI of the second device.

* * * * *